(12) United States Patent
McIntyre et al.

(10) Patent No.: US 6,570,576 B1
(45) Date of Patent: May 27, 2003

(54) METHOD OF PROCESSING SIGNALS AND APPARATUS FOR SIGNAL PROCESSING

(75) Inventors: James Hendrie McIntyre, Basingstoke (GB); Ian McLean, London (GB)

(73) Assignee: Sony United Kingdom Limited, Weybridge (GB)

( * ) Notice: Subject to any disclaimer, the term of this patent is extended or adjusted under 35 U.S.C. 154(b) by 293 days.

(21) Appl. No.: 09/626,054

(22) Filed: Jul. 26, 2000

(30) Foreign Application Priority Data

Jul. 30, 1999 (GB) .............................................. 9918018

(51) Int. Cl.$^7$ .............................................. G09G 5/02
(52) U.S. Cl. .................................................. 345/600
(58) Field of Search ................................. 345/589, 591, 345/592, 593, 600–605, 611, 612; 382/162, 163, 166, 167; 707/313

(56) References Cited

FOREIGN PATENT DOCUMENTS

EP        0 613 309   *   8/1994   ............ H04N/9/64

* cited by examiner

*Primary Examiner*—Matthew C. Bella
*Assistant Examiner*—G. F. Cunningham
(74) *Attorney, Agent, or Firm*—Frommer Lawrence & Haug LLP; William S. Frommer

(57) ABSTRACT

An image processing apparatus processes input signal samples representative of at least part of a color video image to produce legal color signal samples. An over sampled version of the input signal samples is produced. A plurality of adjustment factors are generated which, when combined with the input signal samples, have the effect of converting illegal color pixels of the color image into legal color pixels. The over sampled legalized color signal samples are decimated, resulting in a sampling rate corresponding to that of the base input signal samples, by selecting signal samples from the over sampled version of the legalized color signal samples which have not changed with respect to the corresponding input signal samples. If the signal samples have changed, a plurality of the over sampled legalized color signal samples are combined to produce the decimated legalized signal samples; and if neither the base nor the associated extra color signal samples have changed, base legalized color signal samples are selected.

17 Claims, 16 Drawing Sheets

METHOD OF PROCESSING SIGNALS AND APPARATUS FOR SIGNAL PROCESSING

BACKGROUND OF THE INVENTION

1. Field of the Invention

The present invention relates to methods of processing signal samples representative of a colour video image to produce a legalised colour version of the image. Furthermore, the present invention relates to apparatuses for processing signal samples representative of a colour video image to produce a legalised colour version of the image.

2. Description of the Prior Art

It is well known that the colours of the rainbow, which correspond to light with a range of wavelengths which is visible to the human eye, can be represented from combinations of the colours red, green and blue. For this reason colour television and video images are generated by separating the red, green and blue components of the images and sampling these components at spatially separated sampling points within the image. For example, colour television cameras are provided with a dichronic element which separates the colours of an image formed within a field of view of the camera into red, green and blue components. Each of the red, green and blue components of the image is sampled in two dimensions in accordance with a row-by-column de-composition of the image. Each row is sampled at regularly displaced sampling points to produce a number of samples representing the row which produces the row-by-column de-composition of the image. These sampling points are known to those skilled in the art as pixels. Each of the samples represents one of the red, green and blue components of one of the pixels which make up the image.

The colour image may be re-generated from the signal samples using a colour visual display unit, by separating the signal samples representing the red, green and blue components of the pixels and feeding each respectively to one of three image generators. Each of the image generators operates to reconstruct, row-by-column, a version of the image for one of the three colours of red, green or blue which are super-imposed on a colour screen. By producing the red, green and blue components of each pixel at positions on the screen corresponding to the positions of the pixels from which the colour image was sampled, the colour image is re-generated. Since each pixel is comprised of red, green and blue components, the relative intensity of these components produces a mixture of red, green and blue light which represents the colour at the corresponding point of the image. The mixture of the red, green and blue components can therefore reproduce any of the colours of the original colour image, which can be any of the colours of the rainbow. A combined effect of the three image generators is therefore to reproduce a version of the colour image which is representative of the colour image formed within the field of view of the television camera.

Representing a colour image as red, green and blue signal samples provides a facility for transmitting, recording and reproducing the colour image in some way. However, in order to reduce an amount of information which must be transmitted in order to convey the colour image, known television transmission techniques and video image recording techniques convert the red, green and blue signals into colour difference signals, which are generally comprised of a luminance and a first and a second chrominance signal. The luminance signal is, for example, formed by combining the red, green and blue signal components of a pixel into a single component representative of the relative strength of the light in the image at the pixel location. The first of the chrominance signals is generated by forming a difference between the luminance signal and the red signal, and the second chrominance signal is formed from the difference between the luminance signal and the blue colour signal.

The colour difference signal format is one example of a signal format which forms a signal space in which the pixels of a colour video image can be represented, but which does not directly correspond with the red, green and blue components from which the colour video image was generated. As a result, not all values of the colour difference signal components representing a pixel within the colour difference space correspond to pixels within the signal space formed from the red, green and blue components of the colour image. For example, if the luminance component is at its minimum value of zero, then any non-zero value of the two chrominance signal components will result in a signal value which does not fall within the red, green and blue colour reference space. Similarly, if the luminance signal is at a maximum value which corresponds to white light, then any non-zero values of the two chrominance signals will also not fall within the red, green and blue reference space.

Any colour which does not fall within the red, green and blue reference space is an illegal colour. For the example of colour difference signals, any combination of the three components of the colour difference signals which results in a value which does not fall within the red, green and blue colour reference space will be an illegal value. Such illegal colour values can be produced when the colour images are transmitted or processed as, for example, colour difference signals. For example, video signals are often processed in this format to introduce video effects such as colour wash effects. As a result, values of the three colour reference space components can be produced which are illegal values within the red, green and blue reference space. If these illegal colour values are displayed within a colour image, colours can result which do not match with the legal parts of the image. The colour visual display unit reproducing the image may hard limit the colour value to a maximum value of the component which can be displayed, and the illegal pixels may be reproduced or processed in an unpredictable way.

In an article entitled "Limiting of YUV Digital Video Signals" by V G Devereux from the Research Department, Engineering Division, of the British Broadcast Corporation dated December 1987, a method of converting illegal colour pixels in a form of YUV colour difference signals into legal colour pixels with respect to the red, green and blue (RGB) colour reference space is disclosed. This method changes the components of the pixels in the YUV colour difference space with respect to each other in order to convert the pixel in the corresponding red, green and blue colour reference space into a legal pixel.

Having regard to the above discussion, it will be appreciated that there is a general requirement to provide a method of processing colour video images in order to convert reliably illegal colour pixels of the images into legal colour pixels.

SUMMARY OF THE INVENTION

According to the present invention, there is provided a method of processing input signal samples representative of at least part of a colour video image to produce legalised signal samples representative of a legal colour version of the image, the method comprising the steps of generating an over sampled version of the input signal samples by generating at least one extra signal sample for each base input signal sample, generating adjustment factors from the input signal samples, which when combined with the input signal samples have an effect of converting illegal colour pixels of the colour video image into legal colour pixels, combining the adjustment factors with the input signal samples to produce the legalised colour signal samples, and decimating the over sampled legalised colour signal samples to produce decimated legalised signal samples having a sampling rate corresponding to that of the base input signal samples, by selecting signal samples from the over sampled version of the legalised colour signal samples which have not changed with respect to the corresponding input signal samples, and if the signal samples have changed combining a plurality of the over sampled legalised colour signal samples to produce the decimated legalised signal samples.

It has been discovered that illegal colours can be produced as a result of distortion caused by aliasing errors. The distortion is produced by high frequency components of the video image in the analogue domain which are outside a maximum frequency which can be represented in accordance with a sampling rate of the input signal samples. This produces distortion in the video image as a result of aliasing errors.

To provide an improvement by reducing the effect of this distortion, an over-sampled version of the input signal samples is generated so that these out-of-band components in the video image appear within the in-band components of the over-sampled version of the input signal samples. This provides a further advantage in representing the analogue video signal more accurately because the sampling points of the video image at the lower sampling rate can fall at positions which do not correspond to a maximum of the video signal. The over sampled version therefore provides a better representation of the video signal, because there is an increased likelihood that maxima of the video signal are close to or correspond to the temporal sampling positions. The video image is then legalised in this over sampled form, by generating and applying adjustment factors to produce legalised colour signal samples. However, legal colour pixels of the colour video image can become illegal when an over sampled version of the legalised colour signal samples is decimated since decimating the legalised colour signal samples involves representing a plurality of signal samples to as a single decimated signal sample. By selecting the legalised colour signal samples associated with the original sampling positions of the input signal, this distortion is substantially reduced. The term decimating refers to a process in which an over sampled signal is reduced to a version with signal samples having a sampling rate corresponding to that of the original input signal samples. This may involve combining signal samples to produce a composite decimated signal sample for a plurality of signal samples, or this may involve filtering and then dropping the extra signal samples associated with the over sampled version, and forming the decimated version from the samples at the same positions as that of the original signal samples. Decimating in this sense can cause legal colour pixels to become illegal, as this can involve changing some signal samples.

Advantageously, the step of decimating the over-sampled version of the legalised colour signal samples may comprise the steps of determining whether each of the legalised colour signal samples and the extra-legalised colour signal samples associated with each of the legalised colour signal samples were changed with respect to the corresponding input signal samples and the extra input signal samples when combined with the adjustment factors, and if at least one of each input signal sample and the associated signal samples have changed with respect to the legalised colour signal samples performing the steps of combining the legalised colour signal sample and the extra colour signal samples to form a corresponding decimated legalised colour signal sample, or if neither the legalised colour signal sample nor the associated extra-legalised colour signal samples have changed, discarding the associated extra-legalised colour signal samples and forming the decimated signal sample from the legalised colour signal sample. Decimating the legalise colour signal by selecting the base legalised colour signal sample, that is the signal corresponding to the sampling point of the input signal samples, a possibility of an illegal pixel being generated by combining the base and the associated extra legalised colour signal sample is substantially reduced.

As explained above, although the input signal samples which are representative of the colour video image may have values with respect to a signal space which is different from the red, green and blue signal space an example embodiment of the invention finds particular application where the input signal samples are colour difference signal samples having luminance and two colour difference signal components. As such, in the case where the adjustment factors are calculated and applied with reference to the red, green and blue colour reference space, the step of combining the adjustment factors with the input signal samples comprises the steps of converting the input colour difference signal samples into a colour reference signal samples having values with respect to three orthogonal colour reference axes of red, green and blue light, combining the colour reference signal samples with the adjustment factors and converting the combined colour reference signal samples into colour difference signal samples.

Although the adjustment factors may be digital values which are added to the input signal samples in order to generate the legalised colour signal samples, in a preferred embodiment, the adjustment factors are scaling factors and the step of combining the adjustment factors with the input signal samples comprises the step of multiplying the adjustment factors with the input signal samples.

Accordingly to an aspect of the present invention, there is provided an image processing apparatus according to patent claim 6. Further features and aspects of the image processing apparatus are provided in the appended claims.

BRIEF DESCRIPTION OF THE DRAWINGS

Embodiments of the present invention will now be described by way of example only with reference to the accompanying drawings, in which.

DESCRIPTION OF PREFERRED EMBODIMENTS

Figure 1:
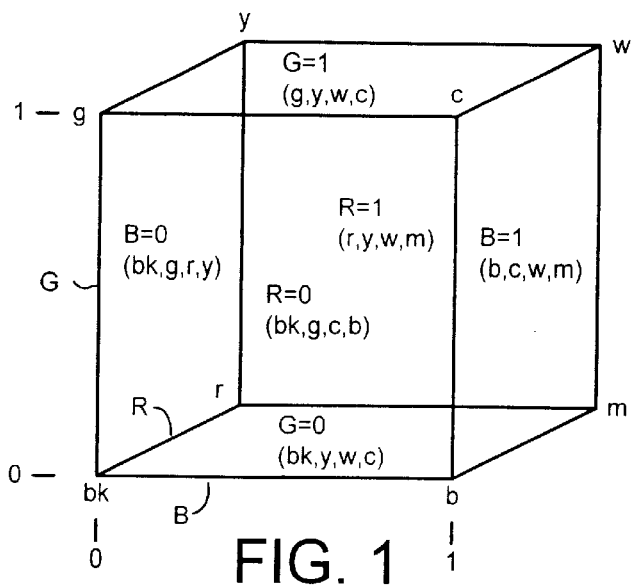
FIG. 1 is a three-dimensional representation of colours within the red, green and blue colour reference space.

A better appreciation of what is meant by the term "illegal colour pixels" may be gathered from a three-dimensional representation of colours which are generated with reference to the red, green and blue primary reference colours, which is shown in FIG. 1. In FIG. 1, the red, green and blue components are represented on orthogonal axes which are perpendicular to each other. The green axis, G, is represented vertically in a scale between zero and one. The blue axis, B, is represented horizontally on a scale between zero and one, whereas the red axis, R, is represented as an axis going away from the plane of the drawing, also on a scale between zero and one.

All the colours which make up a colour image are generated and may be represented by a corresponding mixture of the red, green and blue components. As such, a space formed between the three axes R,G,B (RGB-space) represents these colours so that any point within the RGB-space corresponds to a particular colour. Furthermore, by forming all points which are provided with maximum values of the red, green and blue components, a cube is formed as is shown in FIG. 1. As a result, each of the faces of the cube corresponds to maximum values of either the red, green or blue components. For example, the plane which is parallel to the red axis R is labelled with G=0 since this axis represents a minimum value of the green component for all colours lying within this plane. Correspondingly, a further parallel plane labelled G=1 corresponds to all colours for which the green component is at a maximum. Similarly the other faces of the cube are labelled with B=0 and B=1, R=0 and R=1 to represent the minimum and maximum values that the blue and red components can have within the RGB colour space. The RGB-space formed with in the cube is therefore representative of all legal colours which can exist in an image. The red, green and blue components of a video image are therefore reproduced and combined to re-generate the image, which is representative of the scene from which the image was generated.

As already explained, in order to facilitate transmission of a television or video image which has been generated with reference to the red, green and blue colours, the parts of the image are represented in a form other than with reference to the red, green and blue colours. This may be, for example, to reduce an amount of information which must be transmitted in order to represent the colour video image, and therefore reduce the bandwidth of the television or video signal. One such example of such a form of colour television and video images is the colour difference representation. In order to represent a colour video image, the image is divided into a plurality of lines or rows, and each line divided into sampling points know as pixels. As already explained, for each pixel red, green and blue samples are generated. In order to reduce the band width of a video image, a luminance and two chrominance signals are generated from the red green and blue samples for each pixel. The luminance component is generated in accordance with equation (1) below, in which the coefficients a, b, and c are selected to satisfy equation (2), and the relative ability of the human eye to detect these colours. For example the National Television Standards Committee (NTSC) colour television standard provided in the United States of America, defines the following values for the coefficients a, b, and c for equation (1), a=0.587, b=0.299, and c=0.114. Similar components are provided for the Phase Alternating Line (PAL) colour television system used for Europe.

$$Y=aG+bR+cB \qquad (1)$$

$$a+b+c=1 \qquad (2)$$

$$U=(B-Y)=f(C_b-\text{Off}_b) \qquad (3)$$

$$V=(R-Y)=g(C_r-\text{Off}_r) \qquad (4)$$

The two chrominance signals are generated in accordance with equations (3) and (4). The U component is generated by subtracting the luminance signal sample Y from the value of blue component. The V chrominance signal component is generated by subtracting the luminance signal sample component from the red component. The $C_b$ and $C_r$ representation differ from the U and V representation of the chrominance signals by scaling factors f, g and off set factors $\text{Off}_b$ and $\text{Off}_r$ but are otherwise equivalent. The scaling factors f, g, are determined in accordance with equation (2), in combination with a word length with which samples of the chrominance components are to be represented. As is known to those skilled in the art, the red, green and blue signal samples of a pixel can be recovered from the YUV or $YC_rC_b$ components to reproduce the green component from a simple manipulation of equations (1), (2), (3) and (4). In the following description a video image represented as signal samples having the luminance and colour difference components of the YUV colour difference signal will be referred to as YUV colour difference signals or having YUV signal format. Signal samples having red, green and blue components of the RGB space will be referred to as RGB colour reference signals or having RGB signal format.

Figure 2:
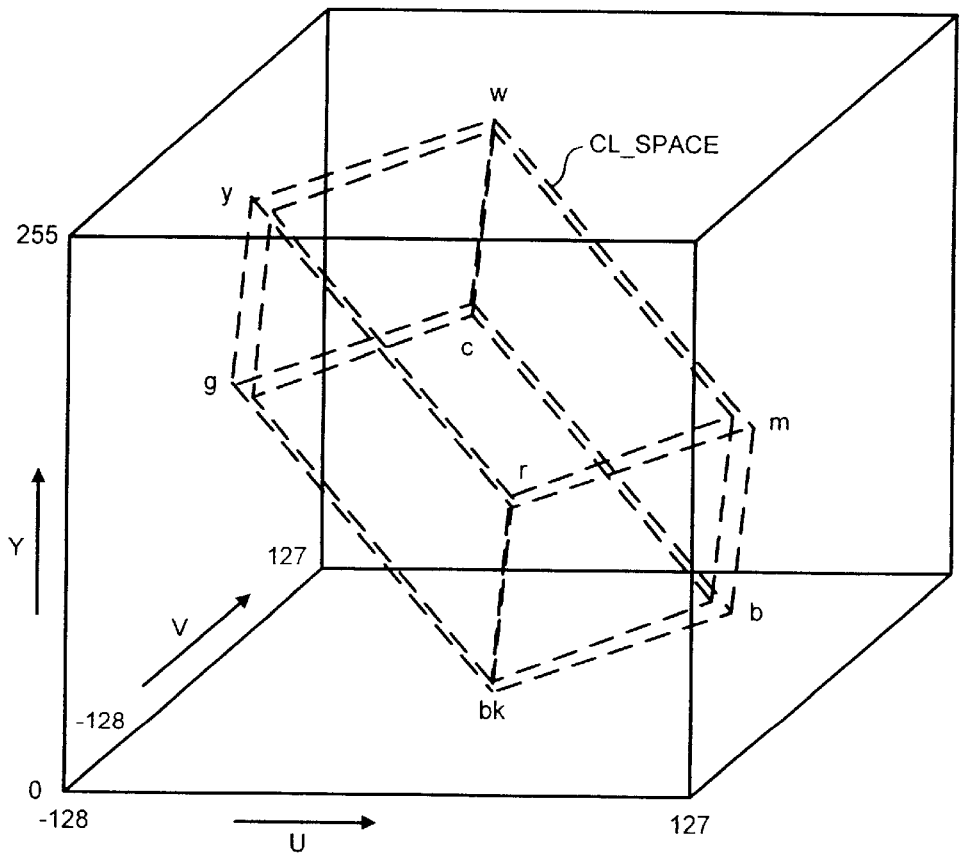
FIG. 2 is a three-dimensional representation of the three-dimensional red, green and blue reference space shown in FIG. 1 within a colour difference signal space.

Colour pixels which are represented in the form of YUV colour difference signals may be considered conceptually as falling within a colour difference signal space which is illustrated in FIG. 2. In FIG. 2 a vertical axis Y is representative of the luminance component of a pixel and is represented as having a value between 16 and 235. This scale corresponds to a range of values which can be represented in digital form by an eight bit number. Correspondingly, the two chrominance signal components are provided on the horizontal and the axis going away from the plane of the paper U,V. These components are represented on a scale between −128 and 127. This range also corresponds to a range which can be represented with an eight bit number, but is converted to a bipolar representation. An effect of representing colour pixels within the colour difference space (YUV-space) is that values of the colour difference components YUV exist which do not correspond to points within the red, green and blue colour reference space (RGB-space). This is illustrated in FIG. 2 by the cube formed from the dashed lines CL_SPACE, with each of the corners of the cube being labelled as black, blue, magenta, red, cyan, green, white and yellow BK, B, M, R, C, G, W, Y. As will be appreciated from the representation of the RGB-space inside the YUV colour difference space shown in FIG. 2, an effect of transmitting colour video images represented as colour difference signals is that signal values in the YUV colour difference space can be generated which do not fall or correspond to those within the RGB-space.

To provide a convenient way of exchanging video and television images between independent television companies and between national television authorities which otherwise use different broadcast standards for transmitting television images, standards for representing television and video images were developed by the Committee Internationale des Radio Communications (CCIR). One such standard is known as the CCIR-601 and provides for digital video signals to be represented as colour difference signals $(YC_rC_b)$ in a format of 4:2:2. This 4:2:2 format signifies that the luminance component is represented as four samples with respect to each of two samples for the two chrominance signal components. Colour television programmes and video images are often represented within the colour difference space in digital form as for the example CCIR-601 4:2:2 format. Within this form, video effects are often applied in order to introduce special effects and colour wash features as desired by a producer of the video or television programme. This can also have an effect of introducing values of colour pixels of the video image represented in the YUV colour difference space which do not correspond to values within the RGB-space. It will be understood from the foregoing discussion with reference to FIGS. 1 and 2, that any sample of a video or television image which produces colour pixels which do not fall within the colour reference space (RGB-space) is an illegal colour value. With the example of representing signals within the YUV-space, it will be appreciated that when an illegal colour value in the YUV space is converted into the RGB-space and displayed, the colour value of this pixel of the image will not match with the surrounding legal values, and furthermore the visual display means reproducing the video image will produce a colour for this illegal pixel in an unpredictable way. To this end there is a requirement to detect and convert illegal colour pixels of a video image into legal colour pixels.

The example embodiments of the present invention operate to convert illegal colour pixels into legal pixels using any one of four methods. These four methods by which illegal colour pixels can be converted into legal colour pixels will be briefly summarised in the following paragraphs.

For the first and second methods of legalising illegal colour pixels of a colour image, the illegal colour pixels are legalised with reference to the RGB-space, by converting the input signal samples in the YUV colour difference signal format into the RGB colour reference format. The first of the methods serves to limit the signal samples corresponding to the red, green and blue components of an illegal colour pixel independently. That is to say that the red, green and blue components of the pixel are limited without consideration of the effect that each component has on the others and correspondingly the way in which the pixel is moved from the illegal position in the RGB colour reference space to a legal position. As a result, changing the red, green and blue signal components independently has an effect of changing the picture colour or hue, and the luminance and contrast.

The method of legalising by independently limiting the red, green and blue components is provided with a further improvement by converting the scale of the red, green and blue components from the scale of 0 to 1 to a bipolar scale, which is formed on an equivalently scale between −0.5 and 0.5. This is implemented for an 8-bit quantised binary representation as a scale by converting the signal components from a scale between 0 and 255 to a scale between −128 to 127. This bipolar representation affords a particular advantage in that the adjustment factors can be calculated for each signal component which can be independently tested to confirm whether the adjustment factor will have an effect on the signal component. Furthermore, rather than simply hard limiting, the adjustment factors, generated for bipolarised RGB signals will have an effect of altering the signal samples even where these signal samples correspond to components at extreme minimum values within the RGB-space shown in FIG. 1, which is at zero. The bipolarised form also provides an advantage for the interdependent RGB method in that the adjustment factors will tend to move the pixels more towards the centre of the RGB space, rather than towards zero, which represents an extreme minimum value in the unipolar form.

The method of generating the adjustment factors $K_X$ for independent RGB limiting is provided in a form of pseudo code for the red component as follows:

Rx=Rin−128;
if Rx<−128, Kr=−128/Rx;
else if Rx>127 Kr=127/Rx;
else Kr=1;

Correspondingly the pseudo code applied by a colour legaliser will be as follows:

Ry=K$_r$xR$_{in}$;
R$_{out}$=R$_y$+128;

Correspondingly the same pseudo code is applied to the green and blue signal samples.

The second of the two legalising methods which is applied to the input signal samples in the RGB signal format is substantially the same as the independent method of limiting the red, green and blue components described above. However, for the interdependent RGB limiting method, the adjustment factors Kr, Kg and Kb are first calculated, and then the lowest of these three adjustment factors is selected, and the other two factors are set to this lowest value. The adjustment factors are then applied, as above. The interdependent method of legalising the red, green and blue components provides a constant hue and some changes in the saturation and luminance of the colour values. The pseudo code for generating the adjustment factors is presented as follows:

Kr, Kg and Kb are calculated as above;

Kmin=lowest(Kr,Kg,Kb);

Kr=Kmin;

Kg=Kmin;

Kb=Kmin.

The calculated adjustment factors are then applied to the input signal samples Rin, Gin, Bin as above, by a colour legaliser to produce the legalised colour signal samples. The third and fourth methods of legalising colour pixels are applied to the signal samples in a form of YUV colour difference signal samples. This provides an advantage in the case that the input samples are already in the YUV colour difference format since there is no requirement to provide a converter to convert the input signal samples into the form the RGB colour reference format. The first of these YUV methods is an independent YUV method which limits each of the two chrominance colour difference components without altering the luminance component. Necessarily this results in a legalised colour signal samples for the pixels in which the luminance component remains constant. Since the luminance component Y is constant, it is possible to test whether V represents an illegal value by testing a corresponding R component of the input signals in RGB colour reference space (Rin), because from equation (4), V=R−Y. The maximum and minimum values are found in accordance with the following pseudo code:

if (Rin>1)
  set Vx=1−Y
  else if (Rin<0) set Vx=−Y
    else set Vx=Vin

Correspondingly for the blue chrominance component;
if (Bin>1)
  set Ux=1−Y
  else if (Bin<0) set Ux=−Y
    else set Ux=Uin However it has been found that this is not sufficient to ensure that the pixel is legal, because it is still possible for the green component of a pixel to be illegal. There remains therefore a problem of ensuring that the green component still is moved on to the either G=1 edge of the colour reference space or G=0 edge of the colour reference space. Therefore, the green component is re-calculated, which for the CCIR-601 standard is performed according to equation (5):

$$Gx=Y-(0.299\ Vx+0.114Ux)/0.587 \quad (5)$$

Three adjustment factors are then calculated according to the following pseudo code:

Ku=Ux/Uin;

Kv=Vx/Vin;

The luminance component is then evaluated to determine whether it is above or below the centre value (0.5) in order to determine whether the green component should be limited to the G=0 edge of the RGB-space or the G=1 edge of the RGB-space. According to this evaluation, an intermediate adjustment factor is calculated for the green component as follows:

if (Y<0.5)
  $K_G=Y/(Y-G_X)$ else
  $K_G=(Y-1)/(Y-G_X)$;

If however $K_G$ is greater than '1', which would correspond to a legal pixel, then it is set to '1' so that is has no effect:

if ($K_G$>1) set $K_G$=1;

Finally the two adjustment factors for the two chrominance components U and V are calculated by scaling each by the intermediate adjustment factor for the green component;

$$K_{uout}=Ku*K_G;$$

$$K_{vout}=Kv*K_G;$$

This method of colour legalising has the advantage that the luminance component remains constant, although variations in hue occur.

The second method of legalising YUV signal samples is the interdependent U V legalising method. With this method, a single adjustment factor K is established for both the chrominance components U, V. This adjustment factor is formed by calculating six intermediate adjustment factors, and forming the final adjustment factor by selecting the lowest of these six intermediate adjustment factors ($K_1$, $K_2$, $K_3$, $K_4$, $K_5$, $K_6$). These are calculated according to the following pseudo code:

For moving the blue component on to the blue edge where B=1;

$K_1=(1-Y)/U$;

For moving the blue component on to the blue edge where B=0;

$K_2=-Y/U$;

For moving the red component on to the red edge where R=1;

$K_3=(1-Y)/V$;

For moving the red component on to the red edge where R=1;

$K_4=-Y)/V$;

For moving the green component on to the green edge where G=1;

$K_5=(Y-1)/(Y-G)$;

For moving the green component on to the green edge where G=0;

$K_6=Y/(Y-G)$;

The adjustment factors for the two chrominance components U and V, are formed from the lowest of the six intermediate values:

Kuout=Kvout=lowest($K_1$, $K_2$, $K_3$, $K_4$, $K_5$, $K_6$)

The common adjustment factor is then applied by the colour legaliser to the chrominance components of the input signal samples according to the same pseudo code given above for the interdependent YUV method. With this method, the luminance and the hue of the pixel colour remain constant.

Figure 3:
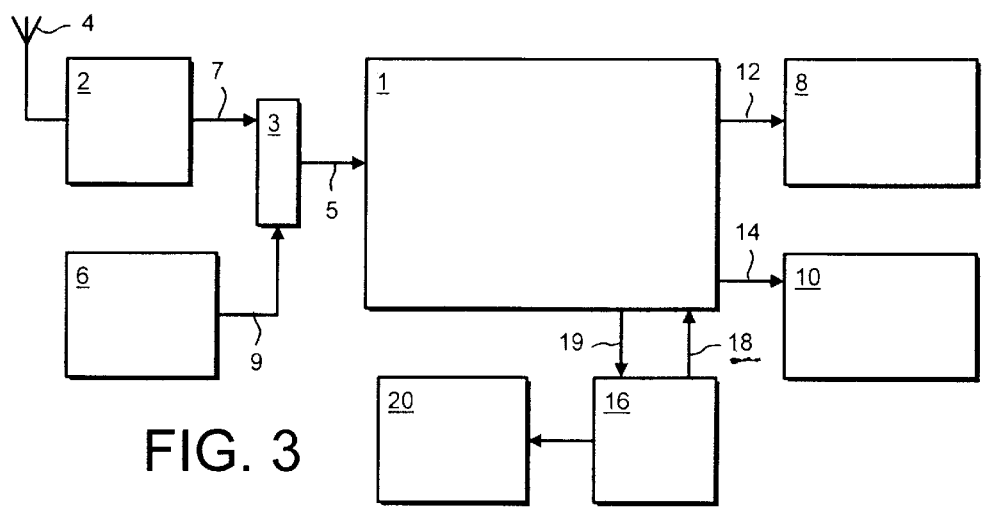
FIG. 3 is a schematic block diagram of a colour television and video processing system.

An arrangement in which a colour video image maybe processed in order to convert illegal colour pixels of a colour image into legal colour pixels is shown in FIG. 3. In FIG. 3, an image processing apparatus 1 is shown to receive an input signal from either a colour television receiver 2, or a video player 6 in dependence upon the configuration of a switch 3. The television receiver 2 has an antenna 4 for detecting a radio frequency signal carrying a television image. The television receiver 2, recovers the colour television image from the detected radio frequency signal and feeds the television image to the switch 3 via a channel 7. Also coupled to the switch 3 via a second channel 9 is a video player 6, which provides an example of an input signal which is generated from a pre-recorded video production. The received television image and the pre-recorded video images are examples of input signals representative of colour video images which may contain illegal pixels and which may be processed by the image processor 1. For the example embodiment shown in FIG. 3, either of these two example input signals may be fed to the image processing apparatus 1, by appropriately configuring the switch 3.

The image processing apparatus 1, operates to detect from the input signals pixels of the colour images which correspond to illegal colours, and to convert these illegal colours to legal colours. The image processing apparatus 1 therefore generates at an output 12 and an output 14, signal samples of a legalised version of the video image received on the input channel 5. In order to control the image processing apparatus 1 and to provide a convenient user interface, a host control processor 16 is provided to control the operation of the image processing apparatus 1. The control processor 16 feeds input control signals via a channel 18 and receives output signals from the image processing apparatus 1 via a channel 19. The control processor 16 is provided with a visual display unit 20, on which information received from the image processing apparatus 1, conveyed by the output signals, is displayed along with appropriate messages to an operator. The output signals are representative of operating parameters and other data which indicate the position and value of signal samples which correspond to illegal colour pixels.

Figure 4:
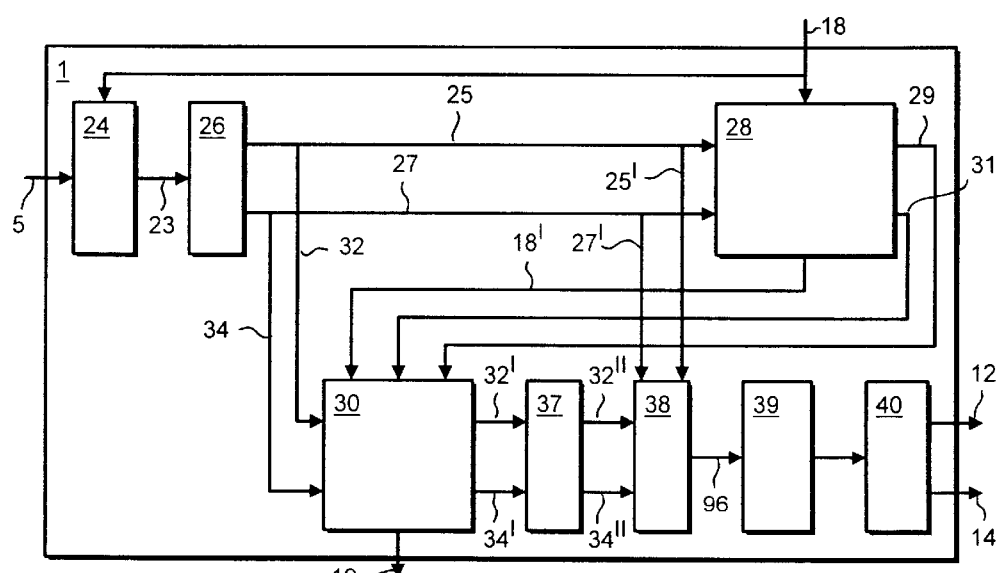
FIG. 4 is a more detailed schematic block diagram of the image processing apparatus shown in FIG. 3 according to a first example embodiment of the present invention.

The image processing apparatus shown in FIG. 3 is shown in more detail in FIG. 4 where common parts appearing in FIGS. 3 and 4 bear identical numerical designations. As will be appreciated from the following explanation, the embodiment of the present invention appearing in FIGS. 3 and 4 finds application in generating a legalised colour version of a video image from input samples representative of the video image. The input signal samples which are representative of the pixels of the video image could be provided in any convenient form. If the example input signals from the television receiver 2, or the video player 6, were in analogue form, then the switch 3 would include an analogue to digital converter to produce a digital sampled version of these analogue signals. However, it is more likely that the television receiver 2 and the video player 6 would produce a digital signal samples representative of the colour image. Furthermore, the signal samples could represent pixels of the video image in the form of colour difference signal samples with components within the YUV-space. These signal samples may be generated in accordance with a known standard such as the CCIR-601 4:2:2 standard. Correspondingly however the input signal samples could be RGB signal samples, or indeed the input signal samples could be representative of components comprising any convenient signal reference space and therefore the example embodiments are not limited to the format of the signal samples or the way in which the video image is represented. The example embodiments of the present invention will be described with reference to input signal samples in the form of the CCIR-601 4:2:2 standard in which the luminance component Y is represented by four signal samples compared to two samples for the red chrominance signal component Cr and the blue chrominance signal component Cb.

The methods of converting illegal colour pixels to legal colour pixels described above require that the input signal samples are in the form having components in either the YUV-space or the RGB-space. This is because the adjustment factors, designated generally as Kx are generated for either the YUV colour difference signal format or the RGB colour reference signal format. For this reason the input signal samples received via the channel 5, must be converted into either of these forms, and in order to give an operator the option of using any of the four colour legalising methods described above, the input signal samples are converted into both these forms.

Figure 5A:
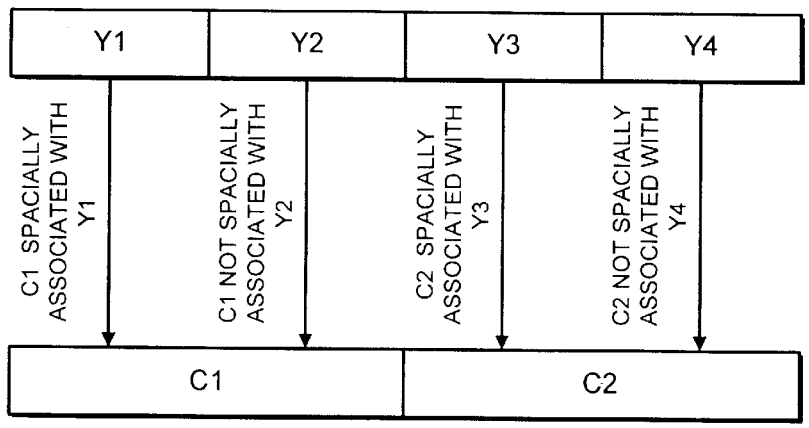
FIG. 5 is a diagram providing a conceptual representation of the association of luminance and chrominance samples in the CCIR-601 4:2:2 format.
Figure 5B:
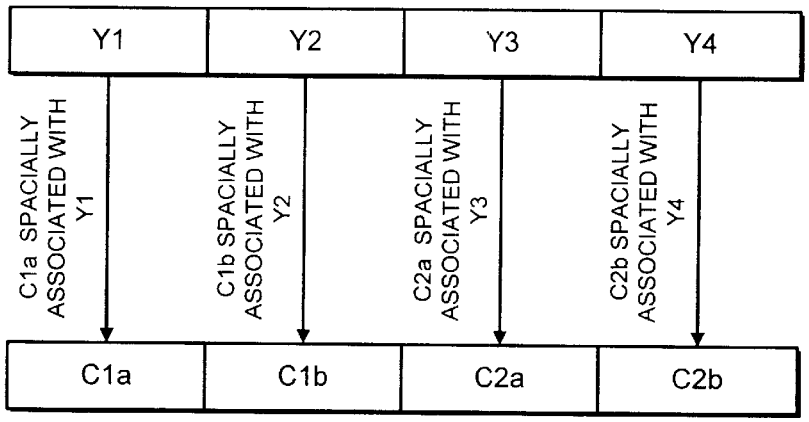

As defined in the CCIR-601 4:2:2 standard, in order to reduce an amount of information required to represent a video image, the number of samples used to represent the chrominance signal components is half that of the luminance components. This reduction in the number of signal samples which are used to represent the chrominance components can be made because the visual perception of the human eye to resolution of an image is less acute for colour than for luminance transients. Hence the CCIR-601 4:2:2 format provides four samples for the luminance component and two samples for each of the red and blue chrominance components. However in order to convert illegal pixels of a video image into legal colour pixels, the video image must be provided in a form in which each pixel has signal samples for all the components which are necessary in order to identify a corresponding point within either the YUV-space or the RGB-space. This can best be appreciated with reference to FIG. 5 in which FIG. 5A shows a representation of the colour difference signal samples in the 4:2:2 format whereas FIG. 5B provides an up sampled version in the 4:4:4 format in which each Y luminance signal sample is provided with an associated chrominance signal sample. In FIG. 5A, each of the luminance signal samples of the 4:2:2 format $Y_1, Y_2, Y_3, Y_4$ are represented as each of four blocks which are arranged in a row. Associated with the first pair of luminance signal samples Y1, Y2 is a first chrominance sample C1, and associated with the second pair of luminance signal samples Y3, Y4 is a second chrominance signal sample C2. The two chrominance signal samples C1, C2 are arranged in a second row below the first row of luminance signal samples to illustrate the corresponding association. As will be appreciated from FIG. 5A, the first luminance signal sample Y1 is provided with a spatial association with the first chrominance signal sample C1. Conceptually this corresponds to the pixel value within the image having a luminance value associated with a colour value at the same position within the image. However there is no chrominance signal sample associated with the second luminance signal sample Y2 as the chrominance signal sample C1 is not spatially associated with the luminance signal sample Y2. Similarly, whilst the second chrominance signal sample C2 is spatially associated with the third luminance sample Y3, there is no chrominance sample spatially associated with the fourth luminance signal sample Y4. As such, for those luminance signal samples Y2 and Y4 for which there is no associated chrominance signal sample, a corresponding position within the RGB colour reference space cannot be determined, so that an adjustment factor for these samples cannot be generated. However, by generating extra chrominance samples by interpolating at temporal positions between the chrominance samples, a chrominance sample will be produced for each of the luminance signal samples. This situation is illustrated in FIG. 5B where the extra chrominance signal samples C1*b* and C2*b* have been generated from the original chrominance signal samples C1*a* and C2*a* and which are now correspondingly associated with the luminance signal samples Y2 and Y4 which previously did not have a corresponding chrominance signal sample. This format is known in the following description as the 4:4:4 format.

First Embodiment

An image processing apparatus which provides a first example embodiment of the present invention is shown in FIG. 4. In FIG. 4, the input samples in YCrCb 4:2:2 format are received from the channel 5 by the image processing apparatus and fed to a colour format processor 24. The colour format processor operates to convert the input signal samples from YCrCb 4:2:2 format into 4:4:4 format, and to produce on an output conductor 23 either RGB colour reference signal samples or colour difference signal samples, in dependence upon control signals received from the control channel 18. The input signal samples in either RGB form or YUV form are fed to an input of an over sampling processor 26, via a connecting conductor 23. As will be explained shortly, the over-sampling processor 26 operates to generates an over sampled version of the input signals samples which is represented as base input signal samples corresponding to the original sampling points of the input signal, and extra sampling points corresponding to the interpolated once over sampled version of the input signal. The base input signal samples and the extra signal samples of the over sampled version of the input signal are fed from two parallel conductors 25, 27 to a adjustment factor generator 28. Two parallel sets of adjustment factors are generated on two output conductors 29, 31, which respectively correspond to the base and extra input streams of samples of the over sampled input signal. The two parallel streams of adjustment factors are fed to corresponding inputs of a colour legalising processor 30. Also fed to the colour legalising processor 30, on two corresponding parallel input conductors 32, 34 are the base and extra samples of the over-sampled input signal. After combining the adjustment factors with the input signal samples the legalising processor 30 presents on two output conductors 32', 34' an over-sampled version of the legalised colour signal samples for the base signal samples and the extra signal samples. The colour legalising processor 30 operates to convert illegal colour pixels within the video image into legal colour values by applying the adjustment factors. After being legalised, the legalised colour signal samples are fed to an anti-aliasing filter 37, which filters the signal samples with a low pass filter in order to reject out of band frequency components associated with aliasing errors. The two parallel streams of the over sampled legalised colour signal samples are then fed to a decimating processor 38. Also fed to the decimating processor 38 on two further conductors 25', 27' is the over sampled version of the input signal samples. The decimating processor 38 operates as will be explained shortly to decimate the over sampled version to the legalised colour signal to a version having a sampling rate corresponding to that of the input signal samples. The decimated legalised colour signal samples are then fed to a second colour format processor 39, which re-converts the legalised colour signal samples into the CCIR-601 4:2:2 standard which are fed to a signal duplicator 40. The signal duplicator 40 operates to duplicate the legalised colour signal samples in 4:2:2 form and to feed first and second versions of these signals to first and second outputs 12, 14. As shown in FIG. 3, the first output 12 is fed to the colour visual display unit 8, for displaying the legalised video image, and the second output 14 is fed to the recording device 10, for recording the legalised video image.

Figure 6:
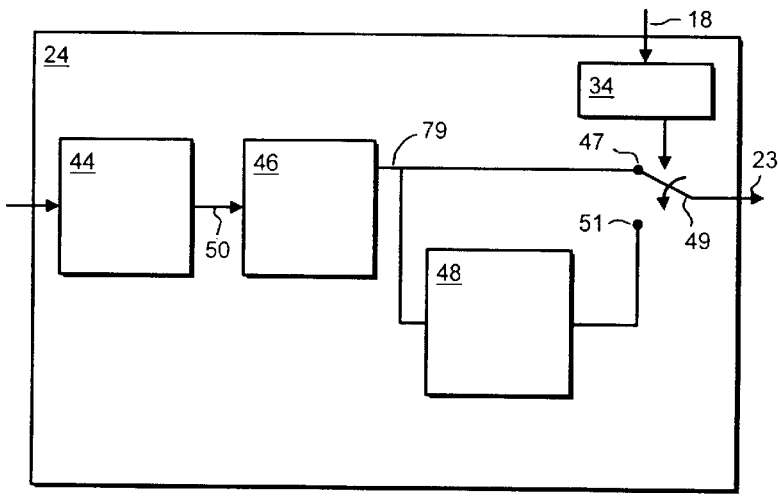
FIG. 6 is a schematic block diagram of a colour format processor which appears in the image processing apparatus shown in FIG. 4.

A schematic block diagram of the colour format processor 24 which performs the function of converting YCrCb signal samples in the form 4:2:2 into the YUV colour difference version and generates a version of the input signal samples in RGB colour reference 4:4:4 form is shown in more detail in FIG. 6 where parts also appearing in FIG. 4 bear identical numerical designations. In FIG. 6 the format processor 24 is provided with a first adjustment processor 44 which receives the input signal samples and operates to convert these signal samples from the YCrCb format to the YUV format by providing corresponding scaling factors in accordance with equations (3) and (4). An output of the first adjustment processor 44 is fed to a rate conversion processor 46. The rate conversion processor 46 operates to convert the YUV signal samples in 4:2:2 to YUV signal sample in 4:4:4 form. The YUV 4:4:4 signal samples are fed from the rate conversion processor to a first input terminal 47 of a controllable switch 49. The YUV 4:4:4 signals samples are also fed to a colour difference to RGB colour reference conversion processor 48. The colour conversion processor 48 operates to convert the YUV 4:4:4 format signal samples into signal samples having components corresponding to the RGB colour reference space which are presented at an output of the colour conversion processor 48 on a second input terminal 51 of the switch 49. The controllable switch is controlled by a switch controller 34, which configures the switch 49 to feed either the input signal samples in either YUV form, or RGB form to the output channel 23. The switch 49 is configured in dependence upon the control signals received on the control channel 18.

Figure 7:
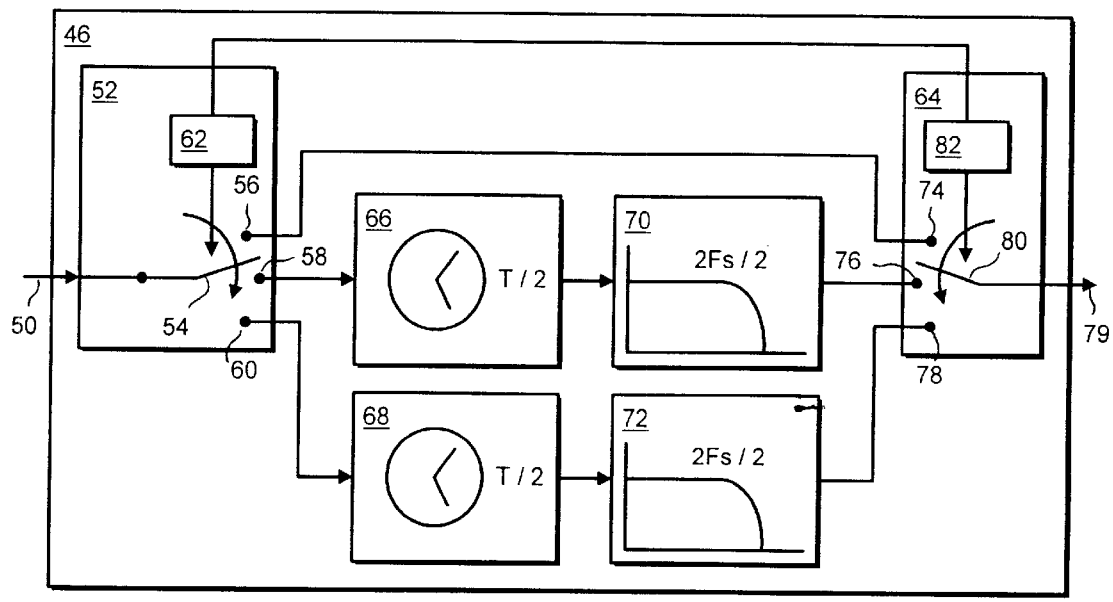
FIG. 7 is a schematic block diagram of a more detailed representation of a rate converter which appears in FIG. 6.

A better understanding of the operation of the rate conversion processor 46 may be gathered from FIG. 7 which provides a more detailed schematic block diagram of the rate conversion processor 46, for which parts also appearing in FIG. 6 bear identical numerical designations. In FIG. 7 the YUV 4:2:2 format signal samples are fed from an input channel 50 to a signal sample de-multiplexer 52. The signal sample de-multiplexer 52 is provided with a switch 54 which operates to feed the signal samples received from the input channel 50 to one of three output terminals 56, 58, 60 under control of a switch controller 62. As will be appreciated, there are various ways in which the YUV luminance and colour difference signal samples may be multiplexed onto the input channel 50. However in accordance with the CCIR standard 601, the 4:2:2 signal samples are multiplex in a form in which the colour difference signal samples are interspersed with the luminance signal samples ( . . . $Cr_1$, $Y_1$, $Cb_1$, $Y_2$, $Cr_3$, $Y_3$, $Cb_3$, $Y_4$ . . . ). However whatever format is used the switch controller 62 operates to separate the luminance and the two colour difference signal samples from each other so that the luminance signal samples Y are fed to the first terminal 56 whereas the red and the blue chrominance signal samples U, V are fed to the second and third terminals 58, 60 respectively. The luminance signal samples are fed via the first terminal 56, to a signal sample re-multiplexer 64. This is because the luminance signal samples are already in the required format and the required number of samples. However, the red and blue chrominance signal samples need to be up-sampled from two samples to four. To this end, the red and blue chrominance signal samples are fed from the second and third terminals 58, 60 to first and second sampling rate converters 66, 68 respectively. The sampling rate converters each operate to introduce extra signal samples between each of the original chrominance signal samples so that effectively the sampling rate of the chrominance signal samples is doubled. The up-sampled chrominance signal samples are then respectively fed to first and second half band filters 70, 72, which are arranged to filter the respective chrominance signal samples with a low pass filter having a cut off frequency substantially at half the new up sampled sampling rate. The half band low pass filter therefore have a pass band equal to a quarter of the sampling frequency. An effect of the half band filters 70, 72, is to provide interpolated signal samples at the extra sampling points introduced by the sampling rate converters 66, 68. As a result, the red and blue chrominance signal samples are converted to a form in which the original two samples are now represented as four samples. The four luminance samples and the four red and blue chrominance signal samples are then fed to respective terminals 74, 76, 78 of the signal sample re-multiplexer 64. The signal sample re-multiplexer 64 is provided with a switch 80 which operates to connect each of the input terminals 74, 76, 78 in accordance with the position of the switch 80 to the output terminal 79 under the control of a switch controller 82. The switch controller 82 operates to present the signal samples in a multiplexed format at the output channel 79 in accordance with a pre-defined format. As will be appreciated any format can be conveniently used and it will be assumed in the following description that each of the four luminance and red and blue chrominance signal samples are multiplexed sequentially together as three groups of four signal samples (4:4:4).

Returning to the image processing apparatus 1 shown in FIG. 4, the signal samples in either YUV or RGB 4:4:4 signal samples are fed via the connecting channels 23 to the over sampling processor 26. As already explained, the adjustment factor generator 28 operates in accordance with either of the above legalising methods to produce for each of the input signal samples of each pixel of the video image within the YUV or RGB signal space a corresponding adjustment factor designated K. In the following description it is assumed that the adjustment factors K are scaling factors which are used to scale the signal samples in order to shift the position of the illegal pixels within the RGB-space so that the colours which they represent are legalised. The adjustment factor generator 28 therefore generates for each of the signal samples corresponding to red, green and blue components within the RGB-space a corresponding adjustment factor Kr, Kg, Kb. However, if the operator selects either of the two colour legalising methods which operate on the input signal samples in the form of YUV colour difference signals, then as indicated above, adjustment factors Ku, Kv are only calculated for the two colour difference signal components U and V. Either of the four colour legalising methods are selected by the operator using the control processor 16, which produces the control signals representative of the selected legalising method, and which are fed to the adjustment factor generator 28 via the input channel 18. The legalised colour signal samples are then formed as an over sampled version by the colour legaliser 30, by combining the adjustment factors with the over sampled version of the input signal samples. The over sampled version of the legalised colour signal samples is then filtered with the anti-aliasing filter before being fed to the decimating processor 38.

Figure 8:
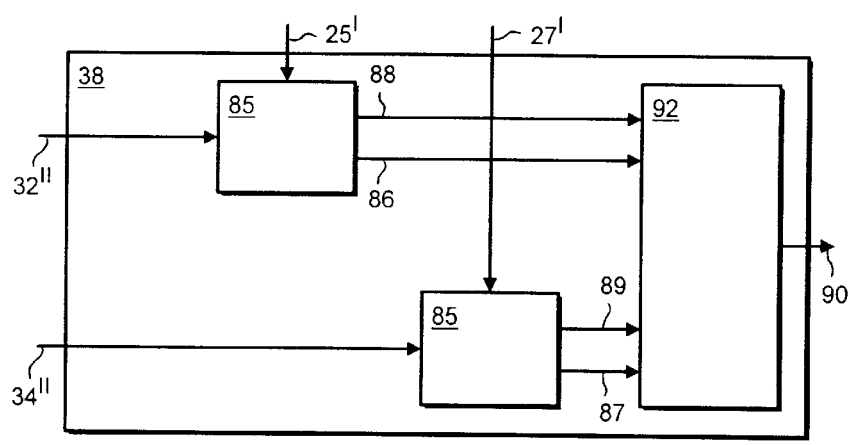
FIG. 8 is a schematic block diagram of the decimating processor which appears in FIG. 4.

A more detailed explanation of the operation of the decimating processor 38 will now be given with reference to FIG. 8 which shows a schematic block diagram of an example implementation of the decimating processor 38. In FIG. 8 the decimating processor 38 is shown to comprise first and second test units 84, 85 each of which receives on a first input legalised colour signal samples from the colour legaliser 30 after being filtered by the anti-aliasing filter 37. To the first test unit 84 the base legalised colour signal samples are fed and to the second test unit 85 the extra legalised colour signal samples are fed from respective connecting channels 32", 34". At a second input of the first test unit 84, the base input signal samples are received from the first connecting channel from the over sampling processor 26. At a second input of the second test unit 85 the extra input signal samples are received from the connecting channel 27' fed from the corresponding output of the over sampling processor 26. The first and second test units 84, 85 operate to compare the legalised colour signal samples with the corresponding input signal samples and if the legalised colour signal sample is equal to the corresponding input signal sample then a first output conductor 86, 87 are respectively set on the first and the second test units 84, 85 to provide a logic "true". On a second output conductor fed from each of the first and second test units 88, 89, the base and the extra legalised colour signal samples are fed to a signal decimator 92. Within the signal decimator 92, each of the logic signals from the output conductors 86, 87 from the respective test units are combined by a logic 'OR' function to produce a composite test signal output. The test signal output is representative of a test as to whether either of the base or the extra legalised colour signal samples changed with respect to the corresponding base and extra input signal samples. If either of these base and extra signal samples have changed then the test signal output will be a logic value of 'FALSE'. In this case, the base and the extra legalised colour signal samples are combined to form a composite decimated legalised colour signal sample which is fed to the connecting output channel 90. If however, neither the base or extra legalised colour samples have changed with respect to the corresponding input signal samples, then the test signal output will be a logic 'TRUE', and in this situation the decimator 92 operates to select the base legalised colour signal sample fed from the output conductor 88 to the output conducting channel 90.

Figure 9A:
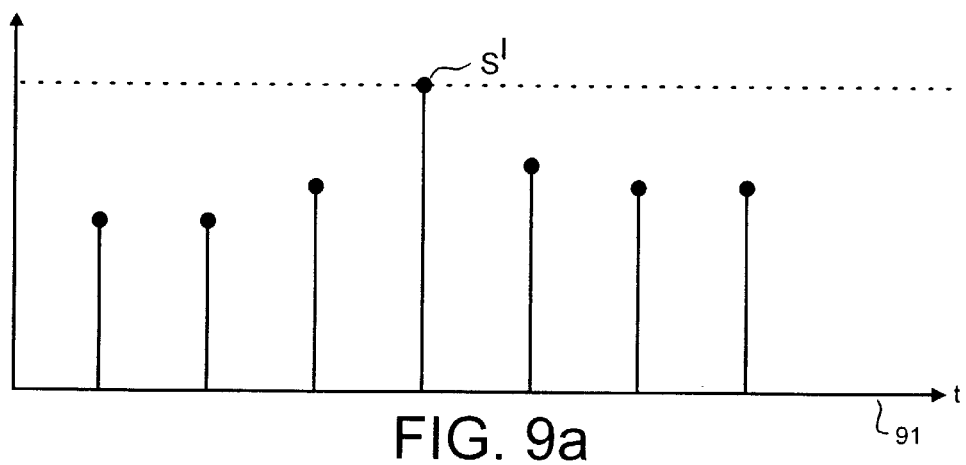
FIG. 9 is a graphical representation of (a) an over sampled version of input signal samples, (b) an over sampled version of legalised colour signal samples.
Figure 9B:
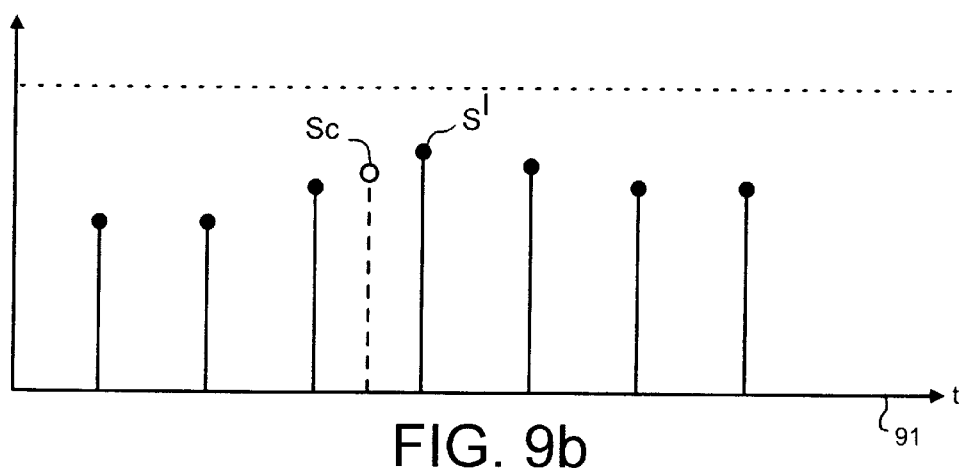
Figure 10:
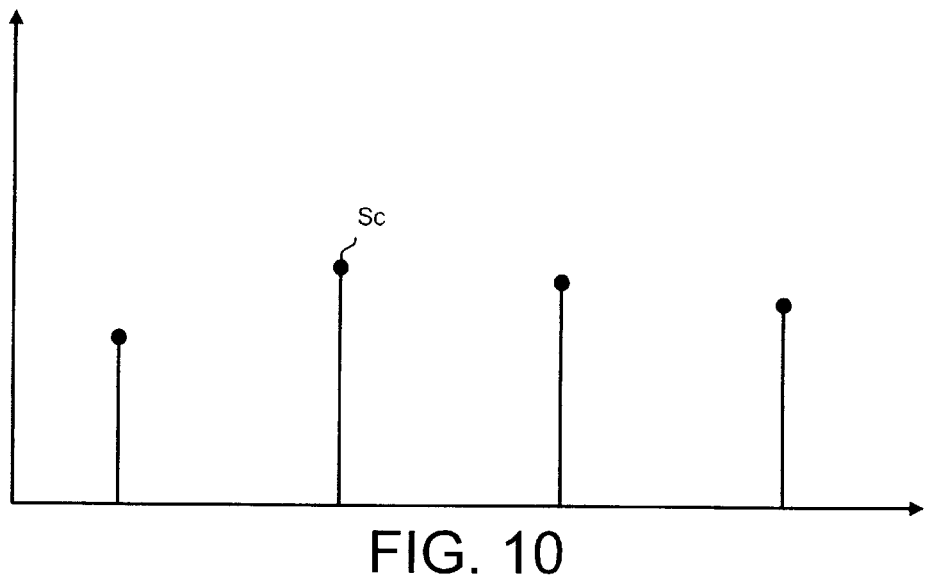
FIG. 10 is a graphical representation of decimated legalised signal samples.

The process of combing the base and the extra legalised colour signal samples can have an effect of once again causing a legal pixel or a legalised pixel to become illegal. This is because the process of combining two input signal samples necessarily requires some manipulation and calculation of the decimated signal sample by combining these two base and extra signal samples. In order to reduce a possibility of illegal pixels being produced in the video image after the adjustment factors have been applied in a way which legalises the video image, the decimating processor 38 operates to select the base legalised colour signal sample and thus avoids producing a combined decimated legalised colour signal sample when neither the base and extra legalised colour signal samples have changed with respect to the corresponding input signal samples. It is only when one of the base and extra legalised colour signal samples have been changed by the legalising methods that the decimator 92 combines these signals to form a composite decimated signal sample for the corresponding sample point of the decimated legalised colour signal samples. This can more easily be appreciated with reference to the graphical illustration presented in FIG. 9. In FIG. 9a, the over sampled version of successive input signal samples are illustrated as having an amplitude represented by the height of the signal samples with reference to the horizontal line 91. In FIG. 9b the over sampled version of the legalised colour signal samples are represented in a corresponding form. By comparing FIGS. 9a and 9b, it can be seen that the centre signal sample S' which is representative of a component of a pixel which makes the pixel an illegal pixel has been changed during the legalising method. This can be appreciated from the reduction in height of the sample S' from the version in FIG. 9a to that in FIG. 9b. In this example therefore the decimating processor would operate to generate a combined version of the legalised colour signal sample S' and the corresponding base or extra colour signal sample associated with the base or extra sample. In this case, the preceding sample which corresponds to a base legalised colour signal sample is associated with the signal sample S' which correspondingly represents an extra legalised colour signal sample. The decimating processor therefore operates to provide an interpolated combined version of the base and extra legalised colour signal samples and this is represented by the interpolated sample Sc. In all other cases in FIG. 9, the legalised colour signal samples have not changed with respect to the corresponding input signal samples. Therefore in operation, the decimating processor 38 will select the corresponding base legalised colour signal sample as the decimated signal sample. This is illustrated in FIG. 10 which shows a version corresponding to the over sampled version shown in FIG. 9b now at the sampling rate corresponding to that of the input signal samples. As can be seen the composite signal sample Sc now appears in the output from the decimating processor 38, whereas all other signal samples are the same as the base legalised colour signal samples shown in FIG. 9b.

Second Embodiment

Figure 11:
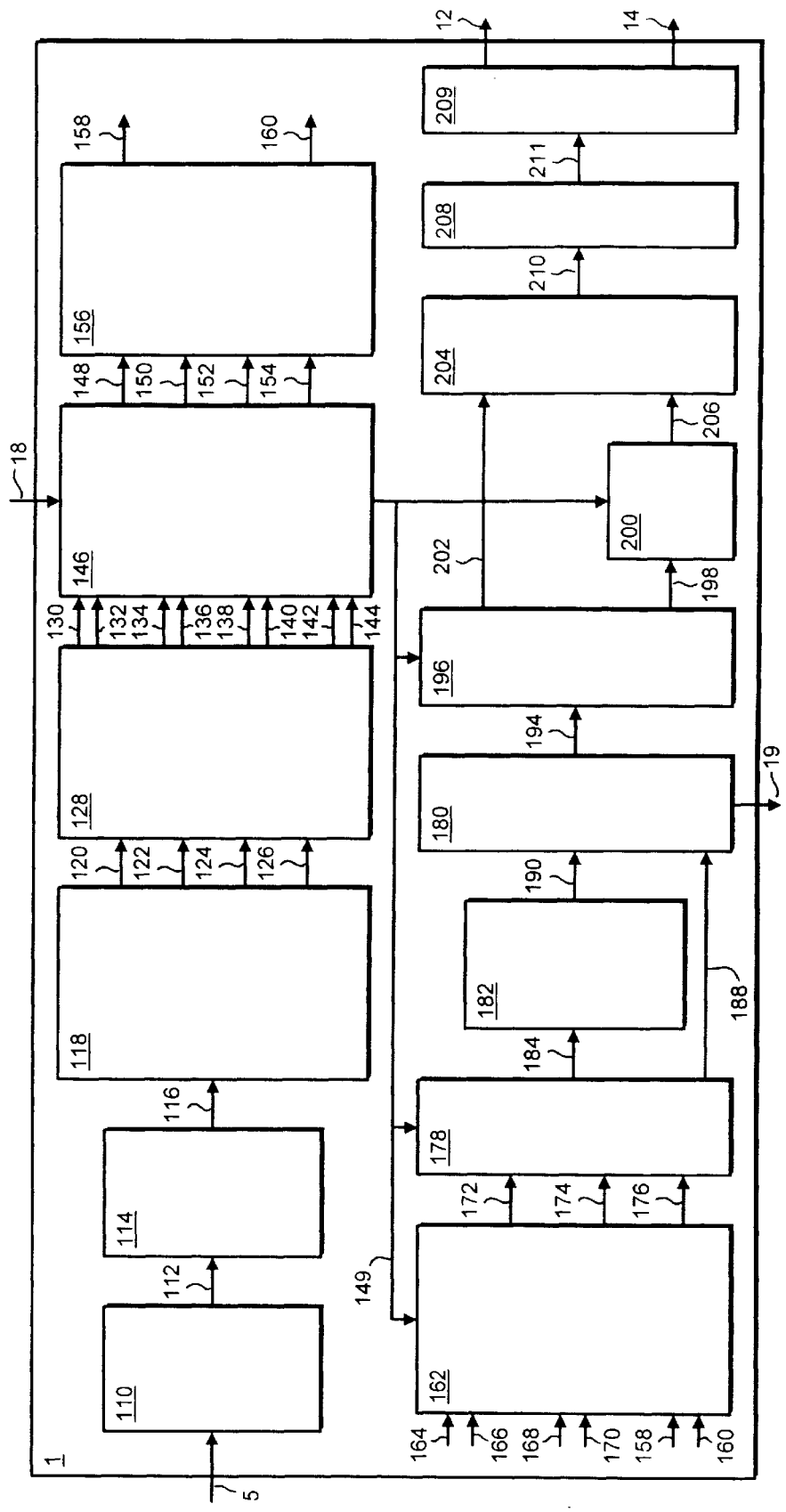
FIG. 11 is a schematic block diagram of an image processing apparatus according to a second embodiment of the present invention.

A second embodiment of the present invention will now be described with reference to FIG. 11 where parts also appearing in FIG. 3 bear the same numerical designations. In FIG. 11, the image processing apparatus 1 is shown to receive the input signal samples via the channel 5 and as with the first embodiment, these signal samples are in the CCIR-601 YCrCb 4:2:2 format. The input signal samples are first fed to a colour conversion processor 110 which operates to scale the signal samples corresponding to the two CrCb chrominance signals so that they are converted to the of form of the two UV chrominance signal samples. Furthermore to allow for quantisation errors which may occur in the input signal samples the word length with which each of the input signal samples is represented increased from ten bits to fifteen bits. This provides an increased resolution from which quantisation errors and rounding effects can be detected and processed, so that these errors can be avoided. Coupled to a connecting channel 112 from the colour conversion processor 110 is a rate conversion processor 114. The rate conversion processor 114 operates to convert the input signal samples in 4:2:2 format into 4:4:4 format substantially in accordance with the rate conversion processor 46 shown in FIG. 6 with the accompanying explanation as presented for the first embodiment. Therefore presented on an output channel 116 are the input signal samples as received from the input channel 5 but in a form of YUV 4:4:4 format. In FIG. 11, each of the channels between the respective parts is representative of colour difference signal samples YUV in 4:4:4 format unless otherwise stated. The signal samples are fed from the connecting channel 116 to an over sampling signal processor 118. The over sampling signal processor 118 operates to generate a four times over sampled version of the YUV 4:4:4 signal samples and presents these signal samples on four parallel output channels 120, 122, 124, 126 in 4:4:4 format. Thus on the first output channel 120, the original input signal samples are provided whereas on the second output channel 122, a first over sampled version of the input signal samples is generated. The signal samples provided on the second output channel 122 therefore correspond to the first over sampled version that is by increasing the sampling rate by a factor of two. On the third and fourth output channels 124, 126 further extra signal samples are generated in accordance with a further doubling of the sampling rate. Further explanation of the operation of the over sampling processor 118 will be provided shortly. However in the following description, those signal samples which are associated or correspond to the sampling points of the original input signal samples before up-sampling will be referred to as base samples, whereas those signal samples which correspond to temporal points which are added after over-sampling will be referred to as extra samples.

Each of the outputs from the over sampling processor 118 is fed to a colour reference converter 128. The colour reference converter 128 operates to produce for each of the YUV signal samples received on the four parallel channels 120, 122, 124, 126, an equivalent version in the form of RGB colour reference signal samples in 4:4:4 format in parallel with the YUV format. Thus, the RGB colour reference converter 128 provides at each of four pairs of output channels 130, 132, 134, 136, 138, 140, 142, 144, respectively YUV and RGB versions in 4:4:4 format with each pair corresponding to the base and respective extra signal samples generated by over sampling. This is to provide the input signal samples in both of the two formats (YUV or RGB) from which either of the four legalising methods may be applied.

As shown in FIG. 11 an adjustment factor processor 146 operates to receive the over sampled version of the input signal samples in YUV and RGB formats in parallel for each of the base input signal samples and three corresponding over sampled versions associated with each of the base signal samples. Correspondingly, therefore the adjustment factor processor 146 operates to generate associated adjustment factors according to either of the two YUV colour difference legalising methods or the two RGB colour reference legalising methods. In the former case only two sets of adjustment factors are generated for each pixel for the signal samples one corresponding to the red colour difference components U, and the other corresponding to the blue colour difference components V. In the latter case a set of adjustment factors is generated for each of the red, green and blue components of the RGB-signal format.

The adjustment factors are generated for each of the base and each of the extra signal samples associated with the base samples. These are provided at four corresponding outputs 148, 150, 152 and 154. Each of the four parallel versions of the adjustment factors are then fed to an adjustment factor softener 156 which operates to soften these adjustment factors by adapting and changing the adjustment factors in order to effect a reduction in distortion which is produced by applying the adjustment factors without softening. In association with the softening process which will be described shortly, the adjustment factors are decimated to the effect that the four times over sampled version of the adjustment factors is reduced to a twice over-sampled version. For this reason only two output channels 158, 160 are provided to feed the softened adjustment factors to a colour legaliser 162, on the two output channels 158, 162 associated respectively with the base signal samples and the extra signal samples corresponding to a twice over sampled version.

As shown in the bottom half of FIG. 11, the colour legaliser 162 receives the over sampled version of the adjustment factors on the input channels 158, 160. Also fed to the colour legaliser 162 on two pairs of further input channels 164, 166, 168, 170, are the YUV and RGB 4:4:4 versions of the input signal samples generated by the over-sampling processor 128 at the first and second input channel pairs 130, 132, 134, 136 which were also fed to the adjustment factor processor 146. In accordance with the method chosen for legalising the video image, the colour legaliser 162 operates to combine the adjustment factors with the version of the input signal samples received on the input channels 164, 166, 168, 170 in order to produce at respective output channels 172, 174 legalised colour signal samples. The first output channel 172 provides legalised colour signal samples corresponding to the base input signal samples whereas the second output channel 174 provides legalised colour signal samples corresponding to the extra over sampled version of the input signal samples. Thus in effect, the output channels 172, 174 provide an over sampled version of legalised colour signal samples corresponding to the input signal samples but over sampled at twice the rate of the input signal samples, which is at rate 8:8:8. Also generated at a further output channel 176 are data representative of a plurality of modified flags, each of which is associated with one of the samples within the base and the extra legalised colour signal samples to indicate whether this signal sample in the legalised form has changed with respect to the corresponding base and extra input signal samples.

The over sampled version of the legalised colour signal samples are fed from the output channels 172, 174 to a decimating processor 178. The decimating processor Filters 178 filters and decimates the legalised colour signal samples from a rate 8:8:8 to a rate 4:4:4. After filtering and decimating the over sampled version of the legalised colour signal samples, the decimating processor 178 feeds the filtered legalised colour signal samples to a second colour reference converter 182 via an output channel 184. The modified flags are fed in parallel to the decimating processor 178 via a channel 176, and are further passed directly to a colour anti aliasing processor 180 via a further control channel 188. In a case where either of the two RGB colour legalising methods were selected, the second colour reference converter 182 will operate to convert the legalised colour signal samples received on the input channel 184 into YUV colour difference signal samples. If either of the two YUV legalising methods were used, then legalised colour signal samples will already be in the YUV form. Therefore the second colour reference converter 182 will provide the legalised colour signal samples in YUV form correspondingly on an output channel 190 connected to the colour anti aliasing processor 180. The colour anti aliasing processor 180 then receives the legalised colour signal samples in 4:4:4 rate in the form of the YUV colour difference samples. The colour anti aliasing processor 180 also receives on the control channel 188 the data representative of the modified flags.

The colour anti aliasing processor 180 operates to the over sampled chrominance components of the UV of the colour difference, in preparation for decimating the chrominance components from four samples to two samples. However the legalised colour signal samples produced at an output channel 194 remain in the over sampled format at a rate 4:4:4.

The legalised colour signal samples in YUV 4:4:4 format are fed from the colour anti aliasing processor 180 via the output channel 194 to a second adjustment factor generator 196. The second adjustment factor generator 196 operates to generate a further set of adjustment factors using either of the two methods described above for generating adjustment factors for YUV signal samples. These further adjustment factors are fed on a first output channel 198 to a second adjustment factor softener 200. The down sampled version of the legalised colour signal samples is then output on a second channel 202 and fed to a second colour legaliser 204.

After passing through the second colour softener 200, the further adjustment factors are fed to the second colour legaliser 204 from an output channel of the second adjustment factor softener 206. The second colour legaliser 204 operates to combine the softened further adjustment factors with the down sampled version of the legalised colour signal samples and generates a final version of the legalised colour signal samples which represents a version of the video image having legal colours. The final version of the legalised colour signal samples is then fed to a second colour conversion processor 208 via a connecting channel 210. The second colour conversion processor 208 operates to scale the signal samples in YUV format so that the chrominance signals are re-converted into YCrCb form colour difference signal samples. The second colour conversion processor 208 also operates to decimate the chrominance signal samples so that the legalised colour signal samples in 4:2:2 format are presented at an output channel 211. Finally a signal duplicator 209 generates a second version of the legalised colour signal samples, and the first and second versions are presented on the two output channels 12, 14. The output channel 19, provides information which represents the position and value of illegal pixel components which are superimposed by the control processor 16 on the displayed version of the video image represented by the legalised colour signal samples.

A better appreciation and understanding of the operations of the second embodiment of the present invention will now be provided with reference to further diagrams which illustrate the operation of each of the processors within the image processing apparatus shown in FIG. 11 in more detail. In order to reduce repetition, those features which generally correspond with those of the first embodiment will not be described in detail. Therefore, for example the operation of the rate conversion processor 110 and colour conversion processor 114 is substantially as described for the colour conversion processor 44 and rate conversion processor 46 presented in FIGS. 5 and 6 of the first embodiment. However, the over sampling processor 118 will now be described in more detail with reference to FIGS. 12, 13 and 14 where parts also appearing in FIG. 11 bear the same numerical designations.

Figure 12:
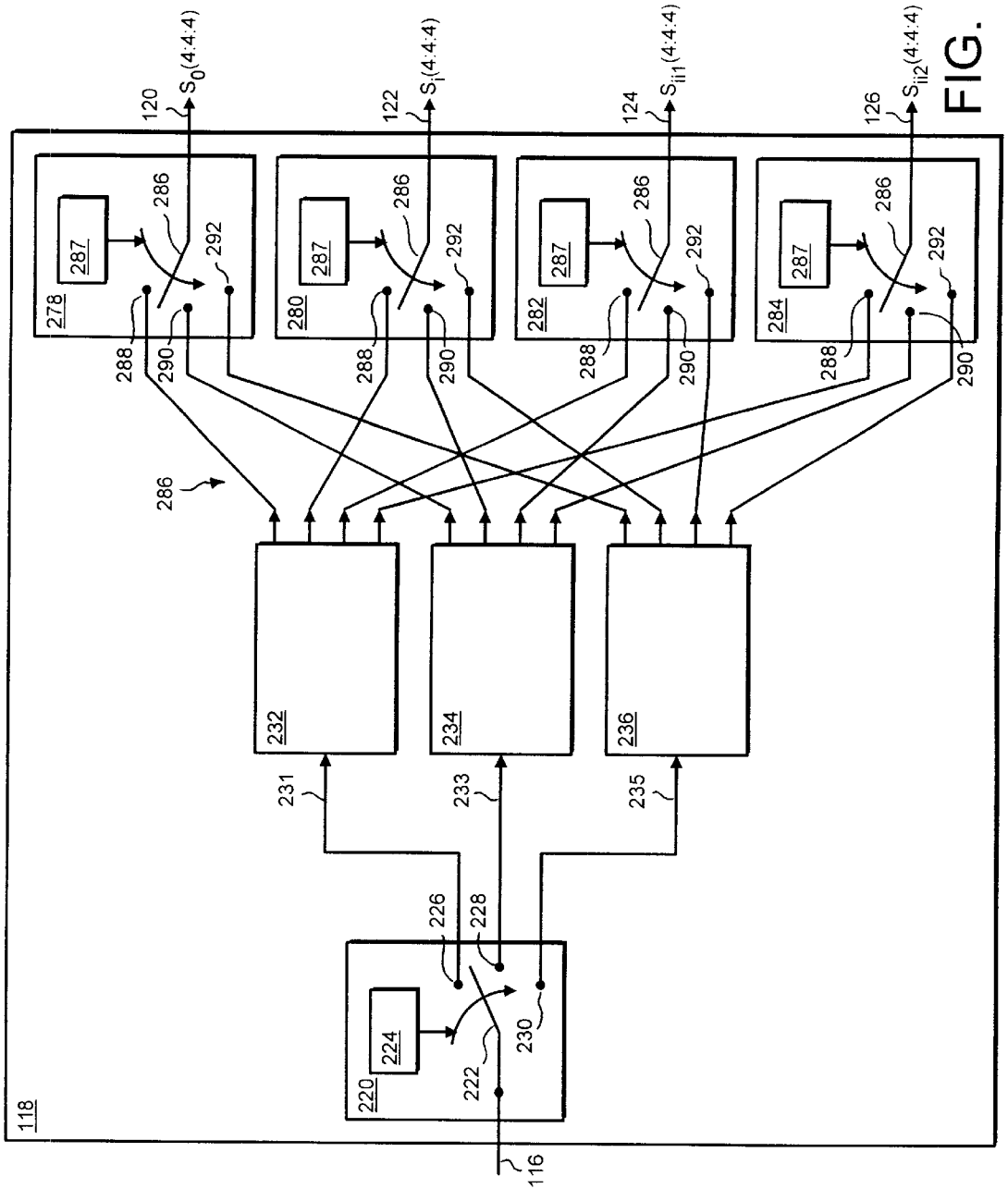
FIG. 12 is a schematic block diagram of an over-sampling processor which appears in FIG. 11.
Figure 13:
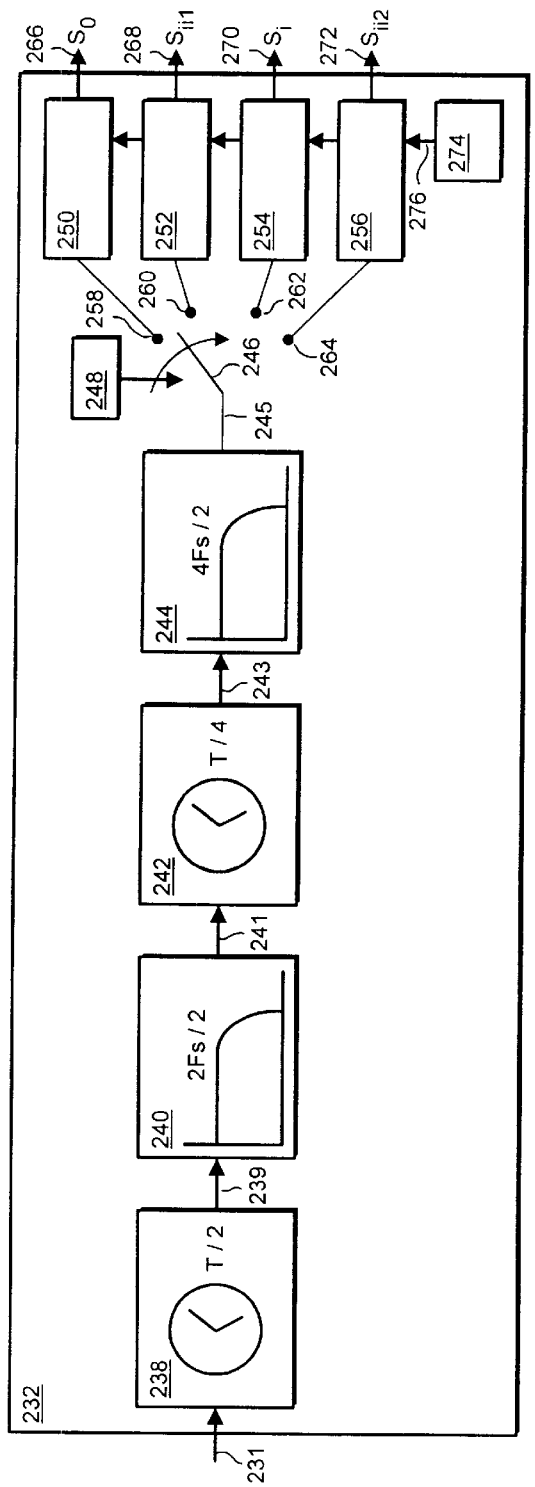
FIG. 13 is a schematic block diagram of an up-sample generator which appears in FIG. 12.
Figure 14:
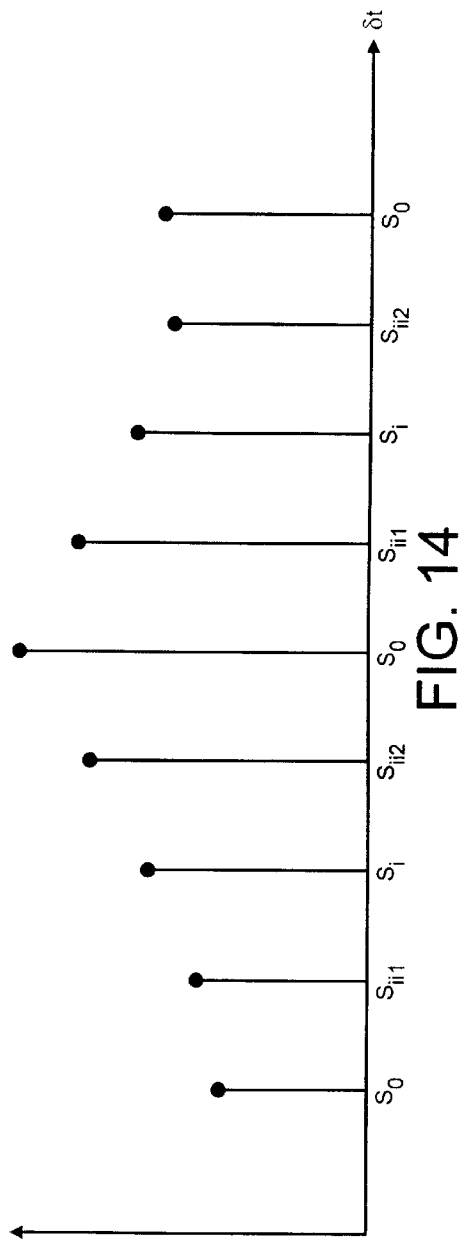
FIG. 14 is a graphical representation of signal samples produced by the up-sample generator shown in FIG. 13.

In FIG. 12, the over sampling processor 118 is shown to receive the colour difference signal samples in YUV 4:4:4 format at a de-multiplexer 220. The de-multiplexer 220 is provided with a switch 222 which operates under control of a switch controller 224 to switch the samples received on the input channel 116 to each of three terminals 226, 228, 230. Each of the terminals 226, 228, 230 is coupled respectively to one of three up sampling processors 232, 234, 236. The de-multiplexer 220 operates to separate the colour difference signal samples by feeding respectively each of the luminance and red and blue chrominance signal samples to a respective one of the three up sampling processors 232, 234, 236. The up sampling processors each operate to generate a four times over sampled version of the signal samples received from the de-multiplexer 220. An up sampling processor is shown in more detail in FIG. 13. The up sampling processor 232 is provided with a first sample rate converter 238 which operates to double the sampling rate of the signal samples received via the channel 213 by introducing sampling points between the received base signal samples. The signal samples which are extra signal samples at these new sampling points are then generated by feeding the converted luminance signal samples to a half band filter 240 which operates to filter the converted luminance signal samples with a low pass filter having a cut off frequency substantially equal to half the new sampling frequency of the signal samples. An effect of this is to produce at the output of the half band filter 241, a version of the luminance signal which comprises the base signal samples ($S_0$) and extra signal samples ($S_i$) which therefore corresponds to a twice over sampled version of the luminance signal samples. The output of the first half band filter 240 is then fed to a second up sampled rate converter 242 which operates to once again introduce sampling points between the existing signal samples so that when the rate converted signal is fed to a second half band filter 244 a four times over sampled version of the luminance signal samples is generated at an output channel 245. The result of this process can be appreciated from the graphical representation of the signal samples presented in FIG. 14. In FIG. 14 the original or base luminance signal samples are designated $S_0$ whereas the first extra signal samples generated by the first over sampling stage are designated $S_i$. The third and fourth signal samples added by the second over sampling stage are designated $S_{ii1}$ and $S_{ii2}$. In effect there is provided a four times over sampled version of the original signal samples. This is not only applied to the luminance signal samples but also the U and V chrominance signal samples by the further over sampling processors 234, 236.

The over sampling processor 232 further operates to re-multiplex the over sampled version of the signal samples by feeding the signal samples at the output of the second half band filter 245 to a controllable switch 246 which operates under influence of a switch controller 248 to feed the signal samples successively to each of four first in first out (FIFO) buffers 250, 252, 254 and 256. The switch controller 248 therefore operates to separate the base signal samples $S_0$ which are fed to a first output terminal 258, the first over sampled extra signal samples $S_i$ which are fed to a second output terminal 260, and the third and fourth extra signal samples $S_{ii1}$, $S_{ii2}$ which are fed to subsequent output terminals 262, 264. Each of these signal samples are fed to the FIFO buffers which operate to group these signal samples in groups of four and then present correspondingly in parallel the base and corresponding extra signal samples on respective parallel output channels 266, 268, 270, 272. The control of the FIFO buffers is provided by a control circuit 274 which is coupled to each of the FIFO buffers by a control channel 276. In effect therefore at the output of each of the over sampling processors 232, 234, 236 for each of the three components of the YUV colour difference signals there is presented four versions for each signal sample received on the input channels 231, 233, 235. The output from each of the up-sampling processors are then cross-connected to one of four multiplexing circuits 278, 280, 282, 284. The cross-connection is afforded by a set of channels 286 which operates to feed each of the base and the extra signal samples to the respective multiplexers 278, 280, 282, 284 which multiplex each of the colour difference signal components YUV on to an output channel. As a result the four parallel output channels 120, 122, 124, 126 provide in parallel the base and the over sampled versions of the signal samples in the colour difference YUV 4:4:4 format. Thus, for example the multiplexer 278 is provided with a switch 236 which is controlled by a switch controller 288. The switch controller operates to select the four samples fed from the FIFO buffers to each of the input terminals 288, 290, 292 so that they are multiplexed on to the output channels 220, 222, 224, 226. It will be understood by those skilled in the art that there are other ways of forming the over sampled version of the input signal, which may not require rate conversion as described above. For example, in a preferred embodiment the three extra samples corresponding to the over sampled signal are generated by copying each of the respective base input signal samples, and representing the corresponding time shifts for each of these samples to generate the four parallel streams of samples.

As will be appreciated from the above description of the parts and operation of the over sampling processor 118, a four times over sampled version of the colour difference signal samples is generated from which the corresponding adjustment factors are produced. Distortion in a video image is produced when the legalising methods are applied as a result of information within the video image not being adequately represented by colour difference signal samples having a sampling rate corresponding to 4:4:4. This is because the video image in the analogue domain, often contains frequency components which are higher than those which can be represented at the lower sampling rate of 4:4:4 so that when colour legalising is performed, and the adjustment factors are applied to the signal samples of the colour video image, further illegal colour pixels are produced within the video image as a result of distortion caused by aliasing errors as a result of such higher frequency components not being adequately represented at this lower sampling rate. Furthermore, unless the temporal sampling points of the video image coincide with the maximum values of the analogue video image signal, then these maximum values will also not be represented by the sampled digital version of the video image so that even after the adjustment factors are applied to the video image in the digital domain, illegal colour values will still be present in the analogue version of the video image. It is for this reason that the colour image is super-sampled, by representing the video image effectively at a rate of 16:16:16 for the YUV colour difference signal format, by generating for the base signals samples having a 4:4:4-rate the three extra signal samples also having a YUV format 4:4:4. Of course, if it were possible then the video signal should be represented by as a continuous signal having an infinite sampling rate. However, it has been found that a benefit resulting from further increasing the sampling rate above a sampling rate corresponding to rate 16:16:16 does not bring a corresponding increase in performance by further reducing distortion with regard to physical problems in implementing a higher sampling rate. It is in this over sampled format that the adjustment factors are generated and applied to the version of the input signal samples which has an effect of substantially reducing distortion associated with an inadequate sampling rate and therefore provides an improvement in making legal the colours of the video image.

Figure 15:
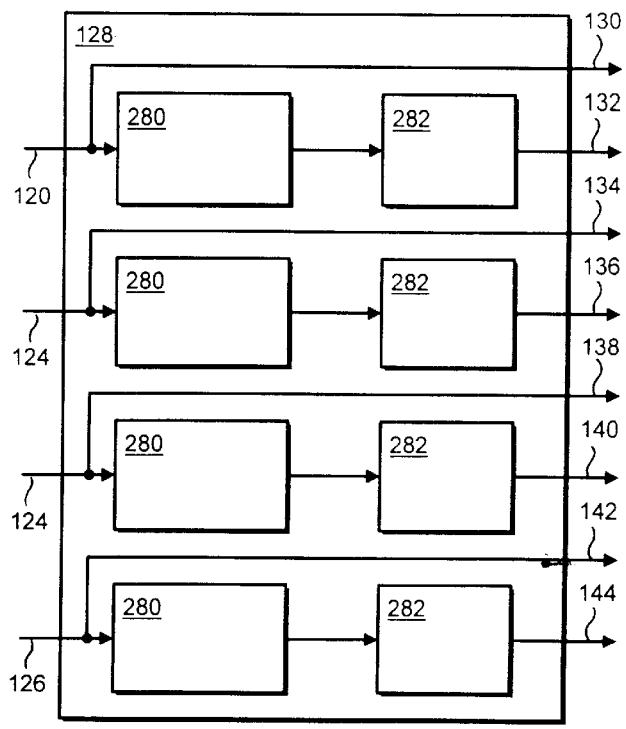
FIG. 15 is a schematic block diagram of a colour reference converter.

After the over sampled version of the input signal samples in the YUV signal format are generated by the over sampling processor 118, a version of the YUV signal samples are generated in the form of RGB reference signal samples having components with reference to the RGB colour reference space. This is effected by the colour reference converter 128 which is shown in more detail in FIG. 15. In FIG. 15 the colour reference converter 128 is shown to include for each of the four versions of the over sampled YUV colour difference input signals one of four colour converters 280 which is coupled to a respective one of the output channels 120, 122, 124, 126, from the over sampling processor 118. Each of the colour converters operates to convert the colour difference signal samples YUV into corresponding RGB colour reference signal samples. The RGB colour reference signal samples are presented at respective output channels which are then connected to respective RGB shift processors 282. The RGB shift processors 282 operate to convert the RGB colour reference signal samples each of which has a value between 0 and 255 of the eight bit samples into a bipolarised version of the RGB signal samples which fall on to an equivalent scale between −128 and 127. The bipolarised RGB colour reference samples are presented at an output to the RGB shift processors on the output channels 132, 136, 140, 144. In parallel the equivalent YUV colour difference signal samples are coupled directly from the four parallel connecting channels 120, 122, 124, 126 from the over sampling processor directly to the corresponding output channels 130, 134, 138, 142 of the colour reference converter 128.

Figure 16A:
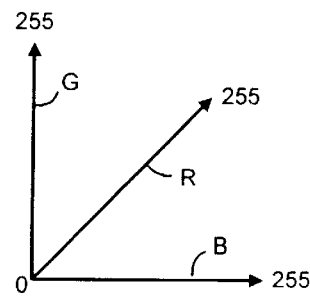
FIG. 16 is graphical representation of the components of colour reference signal samples on corresponding axes.
Figure 16B:
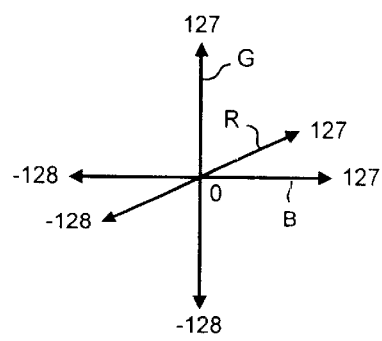

As already explained, a particular advantage provided by the RGB shift processors 282, which form part of the colour reference converter 128 shown in FIG. 15 which can be more easily understood from a graphical representation of the RGB-space in unipolar and bipolar form shown in FIG. 16. In FIG. 16a, the three eference axes of the red green and blue colours are shown as they appeared in FIG. 1, but scaled between 0 and 255. Shown in FIG. 16b is a corresponding representation in the bipolar format generated by the RGB shift processor 282. In FIG. 16b each of the red, green and blue colour axes are now scaled so that the two extremes of the scale lie between values of −128 and 127 with the centre of the axis being at zero. As a result, when the adjustment factors K are generated by the adjustment factor processor 146, and applied to the input signal samples in RGB colour reference form, the effect will be to shift the corresponding pixels within the RGB-space. For the interdependent RGB legalising method this will shift illegal pixels more towards the centre of the space rather than to the extreme minimum of zero which would be the case if the adjustment factors were generated for the colour reference axes shown in FIG. 16a. Furthermore in a case where an illegal colour lies close to or in the vicinity of a minimum colour value, that is at or near '0' in FIG. 16a, an effect of scaling with an adjustment factor would be essentially to multiply the signal sample by zero in order to move the corresponding point within the colour reference space to the minimum value for this particular axis. This represents more of a hard limit and so by representing the colour signal samples in the RGB reference space on a bipolarised form as shown in FIG. 16b, the influence of the adjustment factors will be more accurately represented. Furthermore the softening process when applied to the adjustment factors will be more effective.

Returning to FIG. 11, the adjustment factor processor 146 operates to generate the adjustment factors in accordance with the four methods of legalising the illegal colour pixels of a video image as already described. However in the second embodiment this is performed for each of the four sets of YUV 4:4:4 colour difference signal samples generated by the over-sampling processor 118. The adjustment factor processor 146 according to the second embodiment of the present invention is shown in more detail in FIG. 17 where parts also appearing in FIG. 11 have the same designations. The adjustment factor processor 146 is shown to have an adjustment factor generator 284 for each of the four pairs of input channels 130, 132, 134, 136, 138, 140, 142, 144. The adjustment factor processor 146 also receives on the input channel 18 control signals which are fed to a control processor 286. The control processor 286 generates appropriate control commands which are fed to each of the adjustment factor generators 284 via a control signal channel 288. The control signals serve to indicate to the adjustment factor generators which of the four colour legalising methods should be used. Thus, in accordance with either of the above mentioned legalising methods for converting illegal colour signal samples in either the YUV colour difference signal format or the RGB colour reference signal format the adjustment factor generators 284 operate to generate an adjustment factor for each of the input signal samples having either YUV colour difference components or in the equivalent form of the RGB colour reference components. The adjustment factors are fed on a first output channel 290 to a quantisation processor 292. On a second output channel 291, the input signal samples are fed to a second input of the quantisation processor 292, in the form of the RGB colour reference signal samples.

The adjustment factor quantisation processors 292 provide a further improvement to the colour legalising process, by reducing a possibility of pixels within the colour image becoming illegal, or remaining illegal as a result of quantisation and rounding errors. This improvement is provided by comparing each of the input signal samples in the form of RGB colour reference signal samples with a quantisation threshold. As already explained, the word length of the digital samples with which the input signals samples are represented is increased by the colour conversion processor from ten bits to fifteen bits. Correspondingly, therefore the resolution to which the input signal samples can be represented has increased, thereby allowing the quantisation of the original samples to be investigated with respect to a quantisation threshold, which is determined with respect to the original word length. If the signal sample is less than the quantisation threshold then the adjustment factor calculated for this input signal sample is set to a value of '1' which therefore has no effect when multiplied with the corresponding input signal sample. The reason for introducing this comparison with the quantisation threshold is that the adjustment factors and the input colour signal samples are only represented to within a finite quantisation level. For the present embodiment each of the original input signal samples are only represented with ten bit samples. The quantisation errors can cause the adjustment factors to change an otherwise legal pixel of the colour image into an illegal pixel, because in the ten bit form a signal sample may be rounded up to a value which makes it appear as illegal. The quantisation error is calculated by processing a signal sample from the input channel 5 with a value of half the least significant bit of the ten bit representation. The final value of the signal sample presented at the output of the adjustment factor generator 284 provides a measure of the quantisation error q. The quantisation error results in an adjustment factor being generated which indicates that an input signal sample should be legalised whereas in fact it should not. By setting the adjustment factors for a corresponding input signal sample having a value which falls between the value indicated by equation (6) below, to a value of one, an improvement is provided in reducing a chance of illegal pixels being generated or retained in the colour image.

$$1 < S_{in} \leq 1 + |q| \quad (6)$$

where in equation (6), $S_{in}$ is either of the red, green and blue components of a pixel. The pseudo code, for the input signal samples in RGB bipolar form, where the R, G, and B values have already had 0.5 subtracted from them and which corresponds to the process performed by the quantisation processor 292 is presented as follows:

if (((|R|−RSlack)<=0.5) & (|G|−GSlack)<=0.5) & (|B|−BSlack)<=0.5))
        set K=1.00
    else
        set K=Kmin
    where Kmin is calculated as before by the colour legalising method, and RSlack, GSlack, BSlack are predetermined values corresponding to the quantisation threshold q, and are calculated by feeding a signal sample having a value of half the least significant bit of the ten bit word used to represent the signal samples.

In order to further improve the accuracy with which the adjustment factors are generated, the quantisation threshold RSlack, GSlack, Bslack (|q|) is generated with reference to the RGB colour reference space, as this is the signal space which was used to generate the colour image and will be used to reproduce the colour video image. This provides consistency in applying the quantisation threshold, and is fed by the control processor 286 to the quantisation processor. Thus regardless of the form in which the input signal samples are processed, the quantisation threshold is set in accordance with the RGB colour reference space, so that even if the adjustment factors are calculated for the input signal samples in the form of YUV colour difference signal samples, the RGB signal samples are tested with respect to the quantisation thresholds RSlack, GSlack, Bslack. This is because there is a difference between the quantisation factor produced when adjustment factors are generated for the YUV colour difference signal samples and RGB colour reference signal samples. Furthermore, because the input signal has been over sampled, and the extra signal samples effectively represent samples of further resolution of less importance than the original samples, the quantisation threshold q can be set to different amounts in dependence upon the relative importance of the base and extra samples.

After any quantisation errors have been removed by the quantisation processor 292, the resulting output signal is fed respectively from each of the quantisation processors 292 to an adjustment factor biasing processor 294 via respective channels 296. The adjustment factor processor 146 is provided with a further advantage by arranging for the biasing processors 294 to introduce a pre-biasing constant into each of the adjustment factors under control of the control processor 286. It has been found that when the over sampled legalised version of the colour signal samples are filtered with an anti-aliasing filter and decimated, some of the previously legalised pixels of the video image can again become illegal and other legal parts of the image can produce illegal colour pixels, as a result of the signal samples being changed during the filtering and decimation processes. In order to reduce the possibility of legal colour pixels becoming illegal, the biasing processor 294 operates to scale each of the adjustment factors with a biasing constant as shown generally by equation (7) where $K'_x$ is the adjustment factor before biasing.

$$K_x = K'_x \alpha_g \quad (7)$$

Figure 17:
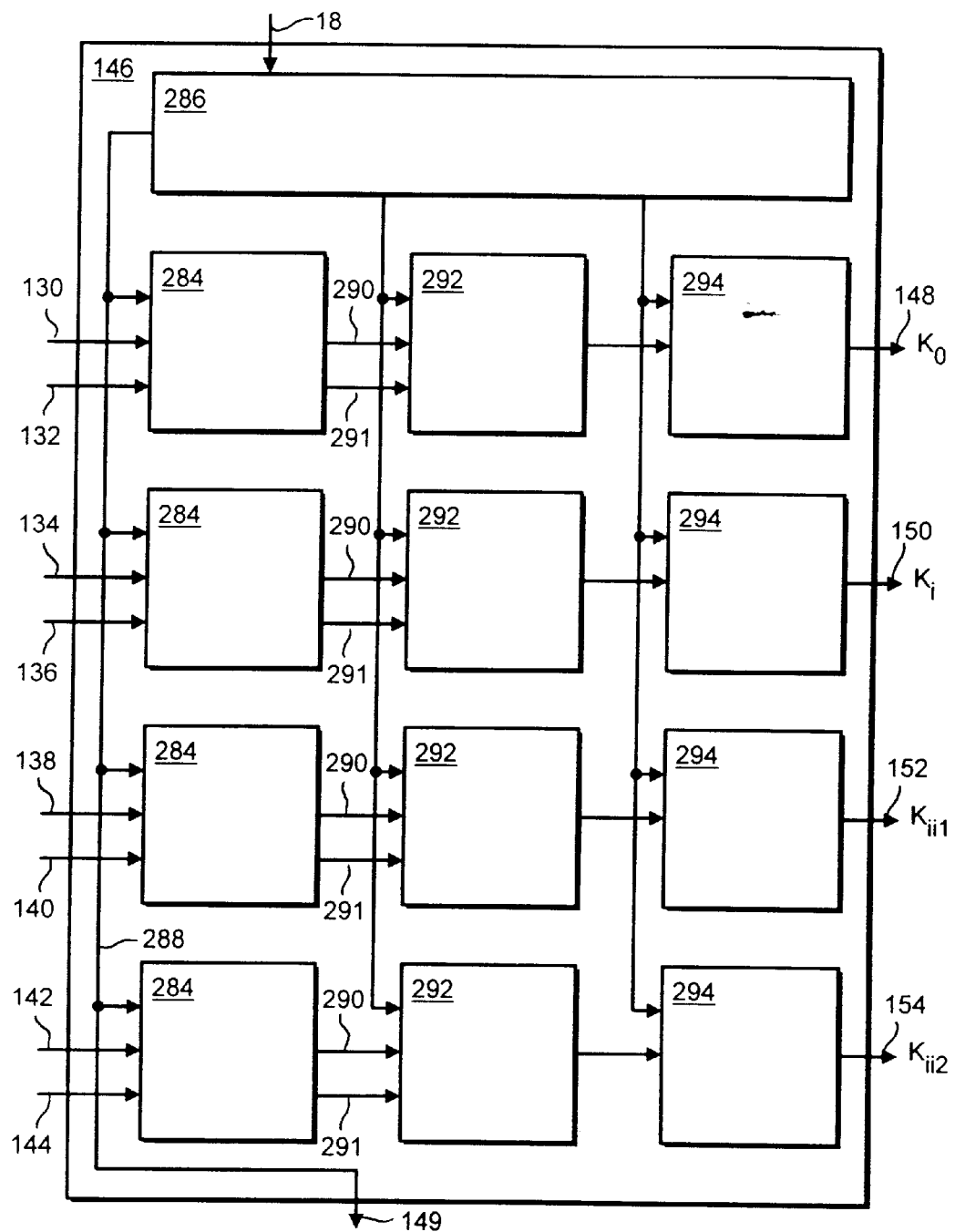
FIG. 17 is a schematic block diagram of an adjustment factor processor which appears in FIG. 11.
Figure 18:
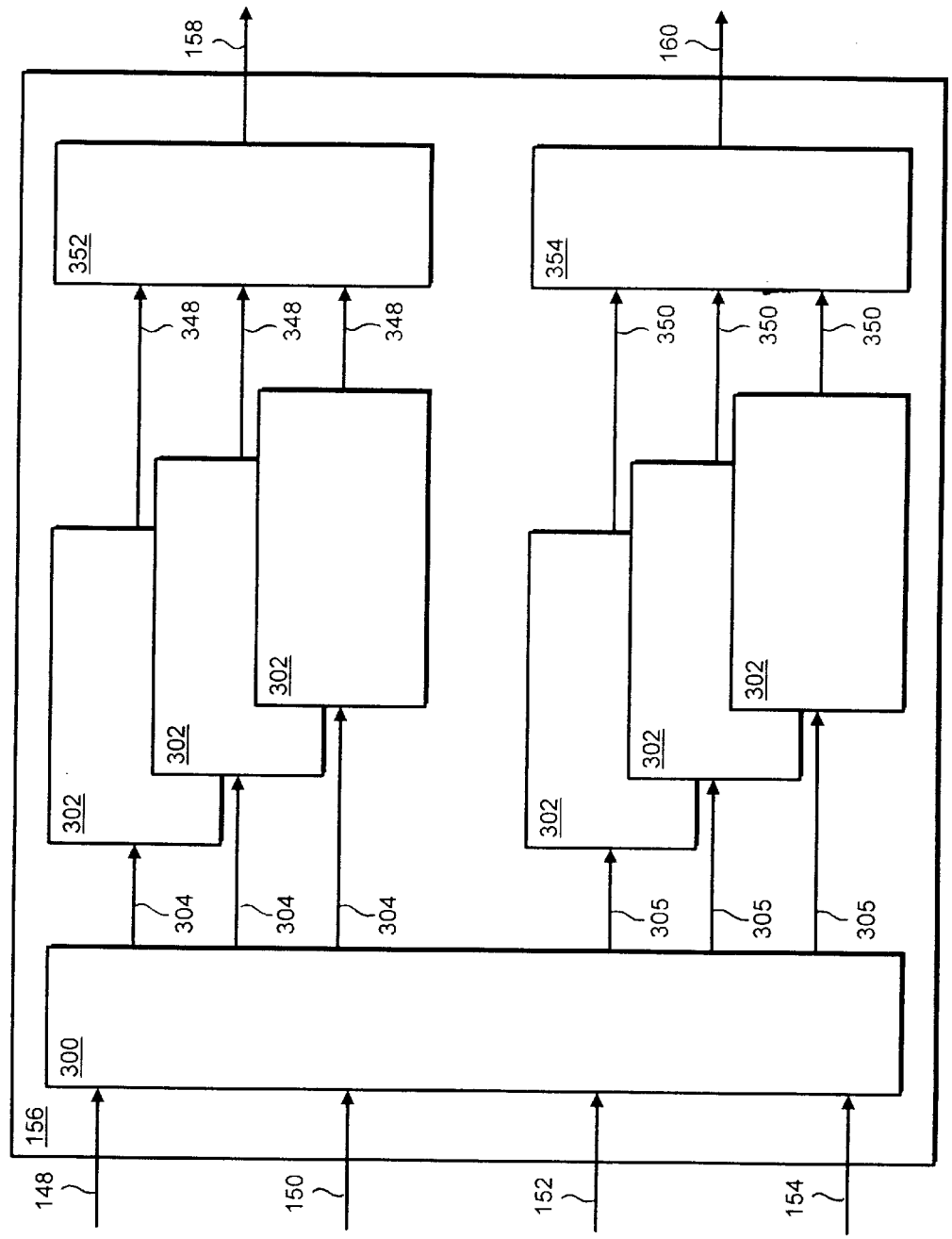
FIG. 18 is a schematic block diagram of an adjustment factor softener which appears in FIG. 11.

By making the biasing constant $\alpha_g$ greater than 1, the scaling factors are correspondingly increased closer to 1, so that their effect on the input signal samples is reduced. As a result, the effect of legalising the video image is reduced so that if desired, the video image can remain proportionally more illegal. If however, the biasing constant $\alpha_g$ is less than 1, then the effect of the adjustment factors is increased so that the possibility of legalised colour values becoming once again illegal is proportionally reduced. This has an equivalent effect of shrinking the RGB colour reference space. This is illustrated in FIG. 2 by the second cube CL_SPACE having a broken line within the first colour reference cube of the YUV colour difference reference space. The biasing constant is applied after the quantisation errors have been removed by the quantisation processor. However when combining the quantisation processor with the biasing constant, regard must be had to a combined effect on making otherwise legal pixels illegal, for both the YUV colour difference signal and the RGB colour reference signals. In pseudo code the combined effect of the quantisation processor and the biasing processor is as follows:

If (((|R|<=0.5) & (|G|<=0.5) & (|B|<=0.5))
   set K=Kmin$\alpha_g$
else
if (((|R|−RSlack)<=0.5) & (|G|−GSlack)<=0.5) & (|B|−BSlack)<=0.5))
   set K=$\alpha_g$
else
   set K=Kmin$\alpha_g$ The biased adjustment factors are presented on the four parallel output channels 148, 150, 152, 154 and fed to the adjustment factor softener 156. As with the input to the adjustment factor processor 146, each of the four outputs is correspondingly associated with one of the base and the three extra signal samples of the over sampled version of the colour input signal samples provided by the over sampling processor 118. Correspondingly, therefore each of the outputs shown in FIG. 17 is provided with corresponding adjustment factor values $K_0$, $K_i$, $K_{ii1}$ and $K_{ii2}$. The adjustment factor softener is shown in more detail in FIG. 18 where parts also appearing in FIG. 11 bear the same numerical designations. The adjustment factor softener 156 shown in FIG. 18 is provided with a de-multiplexing processor 300 to which each of the four input channels 148, 150, 152, 154 are fed. The de-multiplexing processor 300 operates to separate the components of the adjustment factors associated with either the two chrominance signal components of the YUV colour difference signal space or the red green and blue signal components of the colour reference space depending on which of the four colour legalising methods is being employed. The de-multiplexer 300 operates to feed each of the separated signal components and to each of two associated softening processors 302 via channels 304, 305. A better understanding of the operation of the de-multiplexer 300 is provided from the diagram in FIG. 19 where parts also appearing in FIG. 18 bear identical numerical designations.

Figure 19:
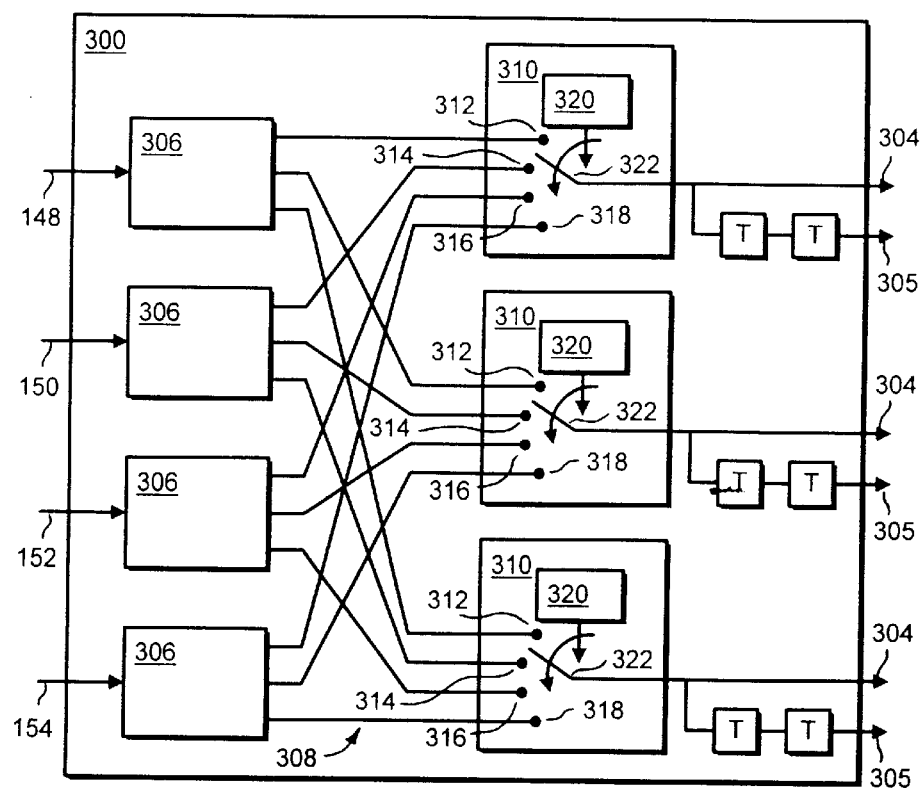
FIG. 19 is a schematic block diagram of a de-multiplexer which appears in FIG. 18.
Figure 20A:
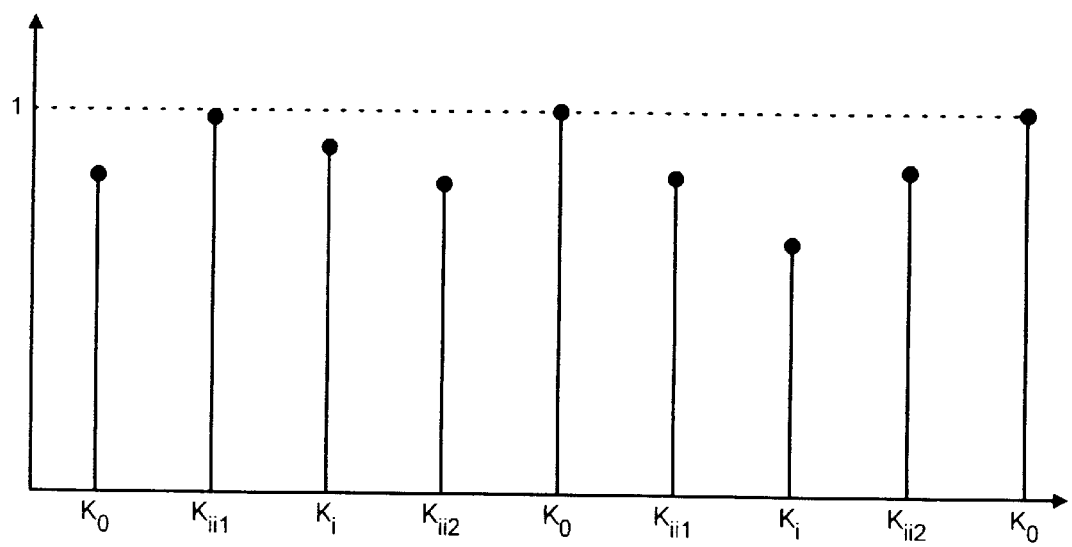
FIG. 20 is graphical representation of signal samples produced by the de-multiplexer shown in FIG. 19.
Figure 20B:
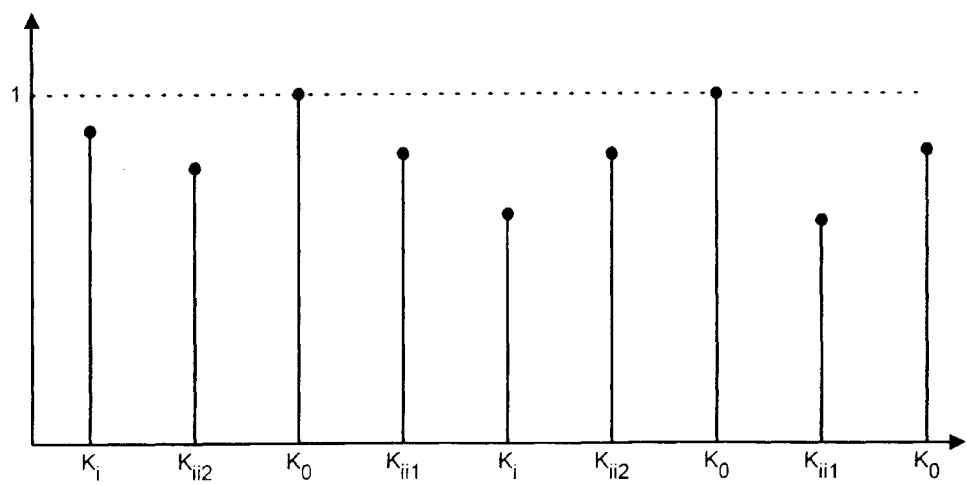

As shown in FIG. 19 the signal samples received on the four input channels 148, 150, 152, 154 are fed respectively to one of four separating processors 306. The separating processors 306 operate substantially in accordance with the signal separating processor 220 shown in FIG. 12 and so further explanation will not be repeated. However, in effect the separating processors 306 separate the three components of the adjustment factors which were generated with respect to the corresponding RGB signal components, and feeds each of the adjustment factors associated with each of these signal components to one or three corresponding multiplexers 310 via channels 308. In the case where the adjustment factors were generated with respect to the YUV colour difference signal components, only two of the multiplexers 310 are required for the adjustment factors generated with respect to the U and V colour difference components. The multiplexers 310 are provided with four input terminals which are connected to respective outputs from the signal separating processors 306. Each of the input terminals 312, 314, 316, 318 is connected by a switch 322 in turn to the output terminal 304 under control of a switch controller 320. A second version of the adjustment factors for each signal component is provided at a second set of output channels 305 via a two-stage delay circuit. The adjustment factors produced at the first and second output channel pairs 304, 305, provide a serial stream of adjustment factors associated with each of the signal components of the RGB signal space or YUV signal space, with the serial stream from the second output 305 being delayed with respect to the first output 304 by two signal samples. The effect of the de-multiplexer 300 can be appreciated from the graphical representation of the adjustment factors which are produced at the pairs of output channels 304, 305 shown in FIG. 20. In FIG. 20 the signal samples from the first output 304 are shown in FIG. 20a and the second output 305 are shown in FIG. 20b. The signal samples are represented as amplitude with respect to a time. Associated with each of the signal samples is the corresponding designation as to whether the adjustment factor is associated with one of the base signal samples $K_0$ or the first over sampled signal samples $K_i$ or the second and third adjustment factor samples Kii1 and Kii2 provided from the second over sampling of the input signal sample.

Figure 21:
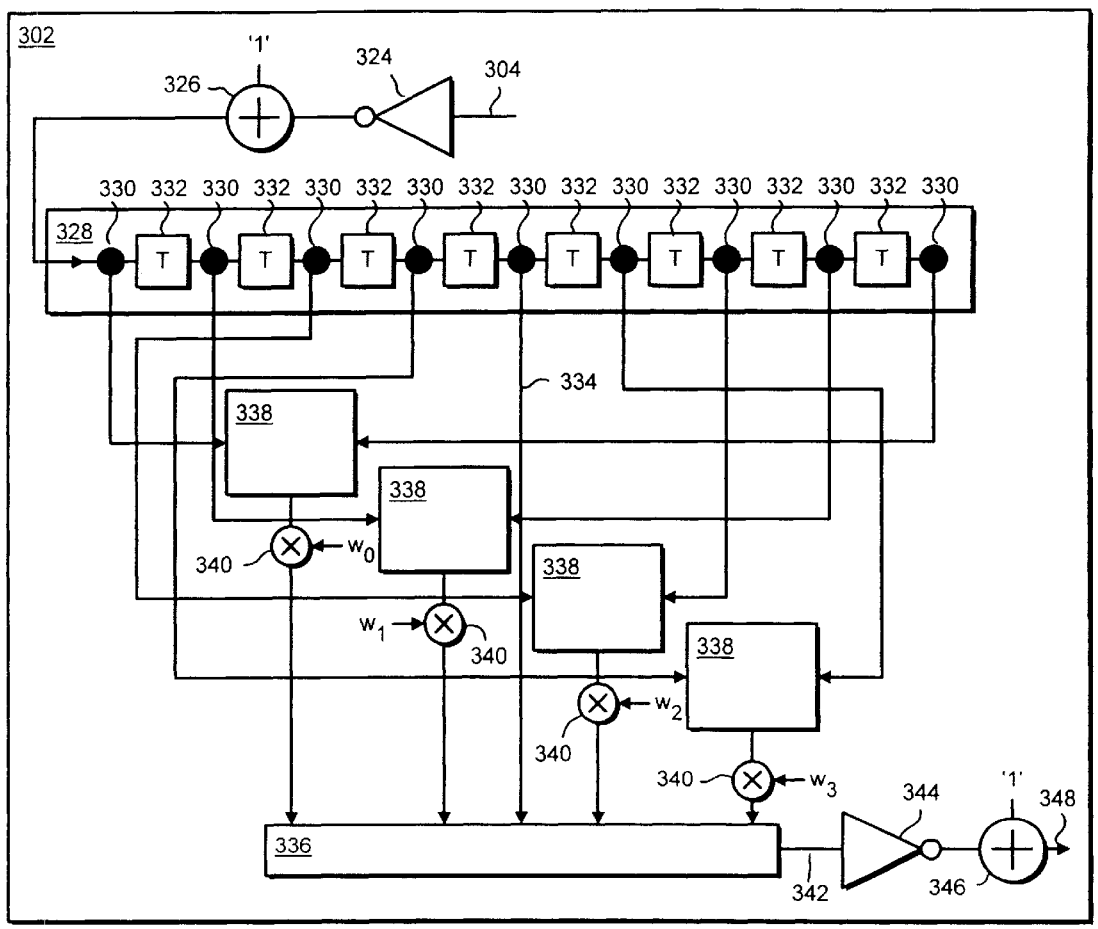
FIG. 21 is a schematic block diagram of a softening filter which appears in FIG. 18.

For each of the adjustment factors associated with each of the respective YUV or RGB signal components, produced at the outputs of the de-multiplexing processor 300, there is provided a softening filter 302. Thus, each pair of the first and second outputs 304, 305 is provided with a corresponding pair of softening filters 302. The softening filter 302 according to the second embodiment of the present invention is shown in more detail in FIG. 21 where parts also appearing in FIG. 18 have the same numerical designations. The softening filter 302 shown in FIG. 21 is provided with an inverter 324 which operates to reverse polarise each of the adjustment factors received on the input channel 304. The output of the inverter 324 is connected to a first input of an adder 326, and to a second input to the adder 326, a value of 1 is connected. As a result, the adjustment factors at the input to the softening filter 302, are converted to an inverted scale, that is from one to zero, to zero to one. The inverted adjustment factors are then fed to a shift register which is shown in FIG. 21 to be comprised of nine stages 330 which are interconnected with delay elements 332. A central tap 334 of the shift register 328 is connected directly to a final non-additive mixing stage 336. At respective corresponding stages either side of the central tap 334, the stages of the shift register are paired and channels from each of these paired stages connect the output of these stages to first and second inputs of intermediate non-additive mixers 338. Each of the intermediate non-additive mixers operates to select the greater of the two adjustment factors received from the first and second inputs corresponding to the paired outputs from the stages of the shift register 328. The selected greater of the two inputs is fed to the final non-additive mixing stage 336 via a multiplier 340. To a further input of the multipliers 340 a scaling coefficient $W_n$ is applied which operates to scale the greater sample produced by the intermediate non-additive mixers 338 before being applied to the final non-additive mixing stage 336. The final non/additive mixing stage 336 operates to compare each of the adjustment factors received on the five inputs and to select the lesser of the five inputs as an output adjustment factor. This selected adjustment factor is fed from the output of the non-linear processing stage 336 to the input of a second inverter 344 which operates to reverse polarise the adjustment factor. This is applied to a first input of an adder 346 and a value of one is applied to the second input of the adder 346 so that at the output of the softening filter 302, the selected adjustment factor is once again inverted from the scale of one to zero, to zero to one.

As will be appreciated from the operation from the softening filter 302 described with reference to FIG. 21, for each adjustment factor presented and fed to the input 304, a softened adjustment factor is generated at the output 348 from a selection of this adjustment factor in combination with the other previously received adjustment factors stored in the shift register 328. The adjustment factors are inverted that is to say reverse scaled from one to zero, to zero to one before being applied to the shift register in order to provide an advantageous effect by which those adjustment factors which are closest to one and would therefore have least effect when scaled with the corresponding input signal samples have least value in the selection process provided by the softening filter. Correspondingly those adjustment factors which will have most effect when scaled with the input signal samples that is to say those closest to zero will be inverted to be closest to one and therefore have most influence within the softener. As a result, the softening process produced by the softening filter is more strongly applied to those adjustment factors which have greatest effect on the input signal samples particularly having regard to quantisation errors and other inaccuracies in the quantised values of the adjustment factors and signal samples. Furthermore by applying a window function, which is provided by scaling each of the inputs to the final non-linear processing stage 336 using the multipliers 340 with the coefficients $W_n$ of the window function, a shaping window represented by the coefficients is convolved with adjustment factors. This reduces aliasing errors in the filter output 302. Although the number of multipliers is show to be four, which effectively corresponds to a five tape window function, it will be appreciated that the window can be of any length.

As will be appreciated from the above explanation, each of the softening filters 302 is a applied respectively to the adjustment factors associated with each of the components of the signal samples of the colour input signals. Furthermore, the same softening filters are also applied to the second output 305 from the de-multiplexer 300 which provides adjustment factors which are delayed in time by two samples. An effect of this second softening filter applied to the second output 305 is to produce a second softened adjustment factor to be applied to the extra input signal samples. The outputs from each of the softening filters 302 are fed from output channels 348, 350 to first and second multiplexers 352, 354. The multiplexers form the adjustment factors into two streams each of which has adjustment factors associated with each of the signal components in either the 4:4:4 colour difference signal format or the RGB 4:4:4 colour reference format. Each stream associated with base and extra samples is provided at the associated output channels 158, 160. Thus, effectively the adjustment factor softener 156 not only softens the adjustment factors by adapting their value in accordance with a smoothing or band limiting effect but also decimates the adjustment factors by halving the number of adjustment factors, so that the adjustment factors are now in an over sampled form of 8:8:8 rate.

As will be appreciated from viewing the diagram of the image processing apparatus 1 shown in FIG. 11, the image processing apparatus 1 generally forms into two parallel streams of processors, the first upper stream being associated with the task of generating the softened adjustment factors and the second lower parallel stream being provided to apply the adjustment factors. To this end, the colour legaliser 162 receives the softened adjustment factors from the two output channels from the softener 156, at first and second input channels 158, 160, and at two further pairs of inputs 164, 166, 168, 170, the YUV 4:4:4 colour difference signal samples and the colour RGB 4:4:4 colour reference signal samples are fed on pairs of channels for the over sampled version of the input signal samples generated correspondingly at the output of the colour reference converter 128. Thus the pairs of signal samples each produce a version of the base input signal samples and a version corresponding to the extra input signal samples produced from over sampling the input signal. The colour legaliser 162 is shown in more detail in FIG. 22 where parts also appearing in FIG. 11 bear the same numerical designations.

Figure 22:
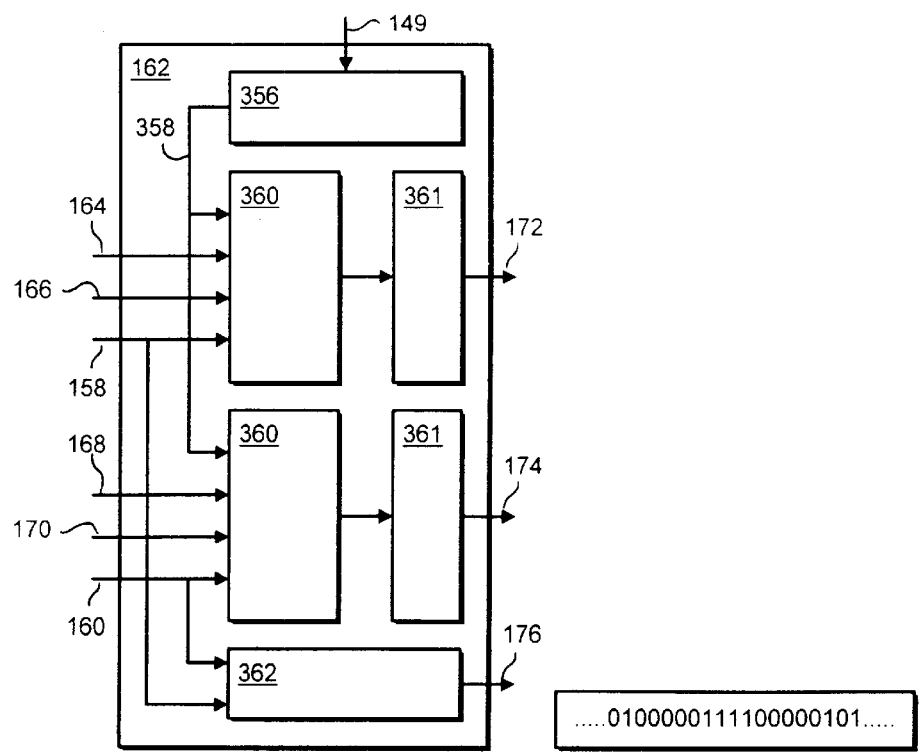
FIG. 22 is a schematic block diagram of a colour legaliser which appears in FIG. 11.

In FIG. 22 the colour legaliser 162 is shown to receive signals from the control signal bus 149, which are fed to a first control processor 356. The control processor 356 operates to feed a control signal indicative of which of the four methods for legalising illegal colour signal samples have been selected, via a control channel 358 to an input of each of two multiplying processors 360. The multiplying processors 360 also receive the two pairs of input channels 164, 166, 168, 170 which feed respectively the base and the extra signal samples produced from the over sampling processor 118 for the YUV colour difference input signal samples or the RGB colour reference input signal samples to the multiplying processors 360. In accordance with which of the four methods for legalising the input signal samples selected by an operator and indicated by the control signals fed from the control processor 356, the multiplying processors 360 operate to multiply the softened adjustment factors received for the base and the extra input signal samples on the first and second input channels 158, 160 by the corresponding components of the input signal samples in either the YUV colour difference form or the RGB colour reference form. At the output of each of the multiplying processors 360, legalised colour signal samples are produced, which are received at polarising converters 361. The colour polarising converters 361, operate to convert legalised signal samples which are produced from input signal samples in the RGB bipolar form to into a unipolar form. This is to reverse the operation of the colour bipolariser 282 for signal samples produced on a first output 172, for base legalised signal samples and the output channel 174 for the extra legalised signal samples.

The first and second inputs from the adjustment factor softener are also fed to a second control processor 362. The second control processor 362 operates to determine for each of the received adjustment factors corresponding to the base input samples and the extra input samples, whether the corresponding adjustment factors have had an effect of changing the corresponding version of the input signal samples in the legalised colour signal samples. If the adjustment factors have an effect of changing the input signal sample with respect to the corresponding legalised colour signal sample then a flag is set and generated at the output 176 of the second control processor 362 to indicate this fact. As described in the next paragraph, these flags, known as modified flags, will be used in the decimating processor 178 and the colour anti-aliasing processor 180.

Figure 23:
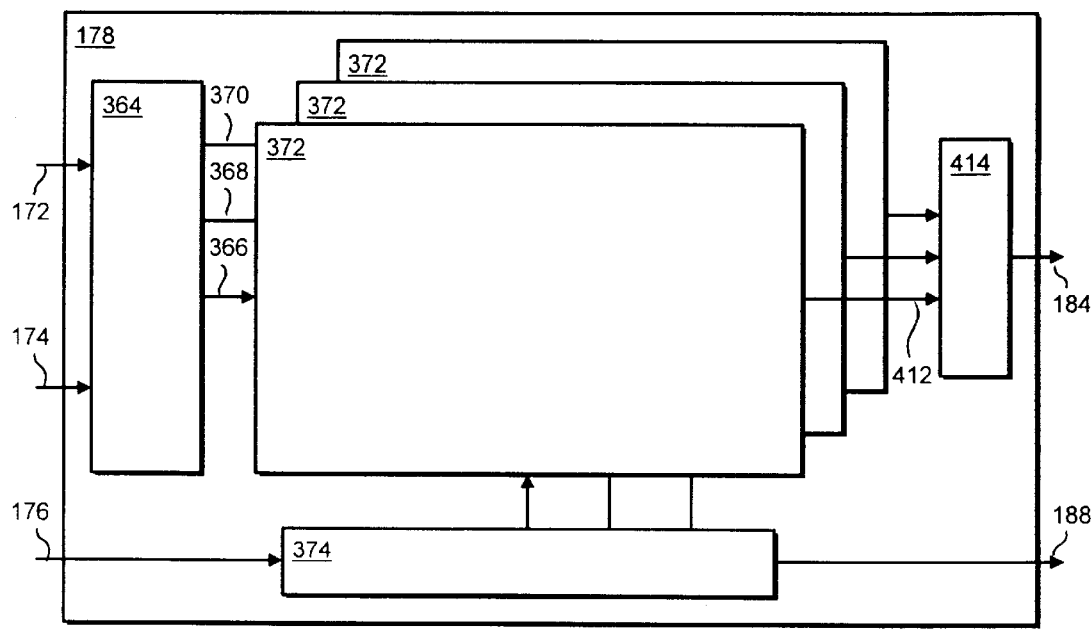
FIG. 23 is a schematic block diagram of a decimating processor which appears in FIG. 11.

The legalised signal samples are fed from the first and second output channels 172. 174 to the decimating processor 178 which is shown in more detail in FIG. 23, for which parts also appearing in FIG. 11 bear the same numerical designations. The legalised colour signal samples corresponding to the base input signal samples, received on the first input 172, are fed to a first input of a de-multiplexer 364. The extra legalised colour signal samples corresponding to an over sampled version of the legalised colour signal are fed from the connecting channel 174 to a second input of the de-multiplexer 364. The de-multiplexer 364 operates substantially in accordance with the de-multiplexer 300, previously described for the adjustment factor softener in FIG. 18, except that the de-multiplexer 364 only requires two inputs and therefore correspondingly will only have two signal separators converters. Thus, a serial version of the signal samples corresponding to each of the YUV or RGB components in over sampled form are separated into each of their three respective components and multiplexed onto one of three respective output channels 366, 368, 370. Each of the output channels 366, 368, 370 therefore presents an over sampled version comprising base and extra signal samples for one of the three components of the legalised signal samples. These signal samples are fed to a first input of a decimating filter 372. The decimating processor 178, also receives at a second input the modified flags which were generated within the colour legaliser 162. The flags are received from the connecting channel 176 by an assignment processor 374 which operates to assign each of the modified flags to a corresponding one of the three decimating filters, in accordance with which of the three signal components the flags were generated. A copy of the modified flags as received on the connecting channel 176 are fed to the connecting channel 188, coupled to the corresponding output of the decimating processor 178.

Figure 24:
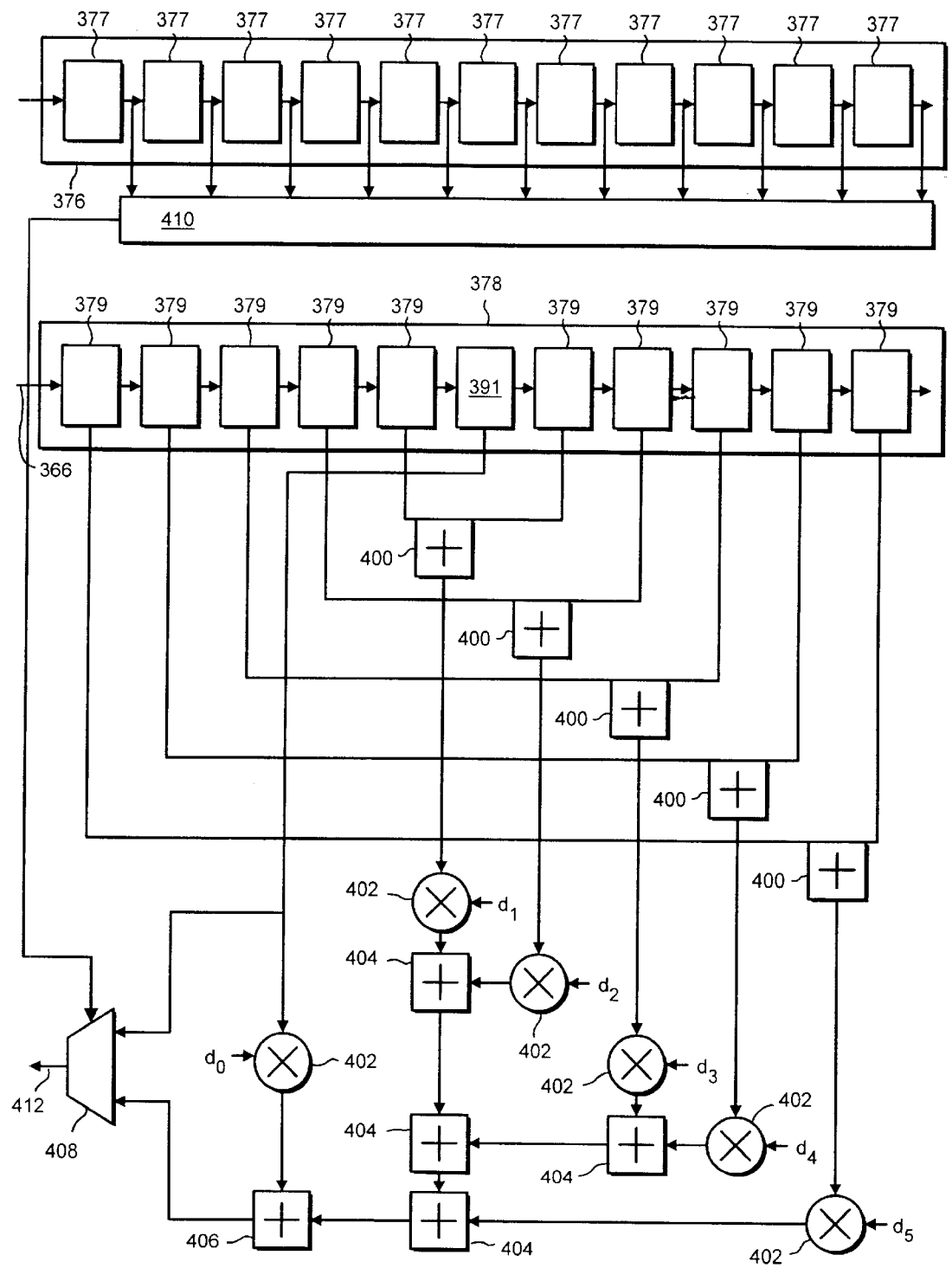
FIG. 24 is a schematic block diagram of a decimating filter which appears in FIG. 23.

One of the decimating filters 372 is shown in more detail in FIG. 24, where parts also appearing in FIG. 23, bear the same numerical designations. In FIG. 24, the modified flags are fed to a first shift register 376 which has a number of stages 377 in which the flags successively fed to the shift register are stored. In a similar manner the signal samples for the component of the legalised colour signal samples for which the filter is provided are fed to a second shift register 378 having a corresponding number of stages 379. Each of the stages 379, equally displaced with respect to a centre stage 382 of the shift registers 378 are paired, except for the centre stage. The content of the first stage of each pair is fed to a first input of an associated adder 400, and the second stage of each pair is fed to a second input of the associated adder 400 An output from each of the adders 400 is fed to a first input of an associated multiplier 402. The multipliers operate to scale the summed contents of the corresponding shift register pair with one of a plurality of scaling coefficients $d_0, d_1, d_2, d_3, d_4, d_5$ of a window function. The scaled summed signal samples are then summed by a network of adders 404, to form a combined signal sample which is fed to a first input of a final adder 406. To a second input of the final adder 406, the signal sample contained in the centre stage 391 of the shift register 378 is fed, and summed with the combined signal sample to produce a composite decimated signal sample which is fed to a first input of a logic gate 408. The signal sample of the centre stage 391 of the shift register 378 is also fed to a second input of the gate 408. Each stage of the second shift register is connected to a logic 'OR' function unit 410, which generates a logic output signal which is fed to a third control input of the logic gate 408. The logic gate 408 presents a decimated sample on the output conductor 412.

In operation, the signal samples are fed to the second shift register in succession, and are combined by the adders 400, and scaled by the window function formed by the coefficients d0, d1, d2, d3, d4, d5, and summed to formed the composite decimated output signal sample fed to the logic gate 408. The corresponding modified flags are logic 'ORed' to determine whether any of the legalised colour signal samples within the shift register 378 have been changed by the colour legaliser 162 from the input signal samples. If none of the legalised colour signal samples have changed with respect to the input signal samples then the control signal fed to the logic gate 408 is true, which sets the gate to feed the signal sample from the centre stage 391 of the shift register 378 to the output conductor 412. If however any of the flags in the first shift register 376 have been set 'FALSE', indicating that a legalised colour signal sample has changed with respect to the input signal samples, then the control signal fed to the logic gate is set 'FALSE' with the result that the composite signal sample is selected as the decimated signal sample. Furthermore by feeding two samples to the second shift register for every decimated signal sample formed, the signal is decimated from 8:8:8 to 4:4:4.

The second shift register 378, the adders 400 and the associated multipliers 402 combine to perform a combined decimating and filtering process which generates at the output of the final adder 406 a decimated signal sample. However if none of the legalised colour signal samples, within the corresponding memory length or constraint length of the second shift register 378 have changed with respect to the input signal samples, then the modified flags which are 'OR-ed' and fed to the control input of the gate 408 arrange for the signal sample held in the centre stage to be fed to the output conductor 412. This arrangement of bypassing the decimating filter provides a further advantage to the second embodiment of the invention which is associated with the possibility of the signal samples which are combined by the decimating filter being made once again into illegal colour pixels. By determining whether either of the base or the extra legalised colour signal samples within a window which corresponds to the constraint length of the decimating filter were changed by the colour legaliser 162 and forming the decimated signal sample from the base legalised colour signal sample, a risk of producing illegal pixels as a result of combining the base and the legalised colour signal samples into a composite signal is reduced. At the output of the decimating processor 178, the multiplexer 414 again multiplexes the components of the pixels of the legal colour video image to form a stream of data in the format 4:4:4 for the three YUV or RGB components corresponding to the colour difference signals.

The legalised colour signal samples are fed from the decimating processor 178 via the channel 184 to the second colour reference converter 182. The second colour reference converter 182 operates to convert the legalised colour signal samples from the RGB colour reference space to the YUV colour difference space in the case where either of the two colour legalisation processes for RGB signal samples were used. If one of the two other colour legalising methods for YUV signal samples were chosen which require the signal samples to remain with components corresponding to the YUV colour difference reference space, then the conversion process provided by the colour conversion processor 182 is bypassed. In either case the legalised colour signal samples are presented as YUV colour difference signals at an output of the conversion processor 182 and fed via the connecting channels 190, to the colour anti-aliasing processor 180.

Figure 25:
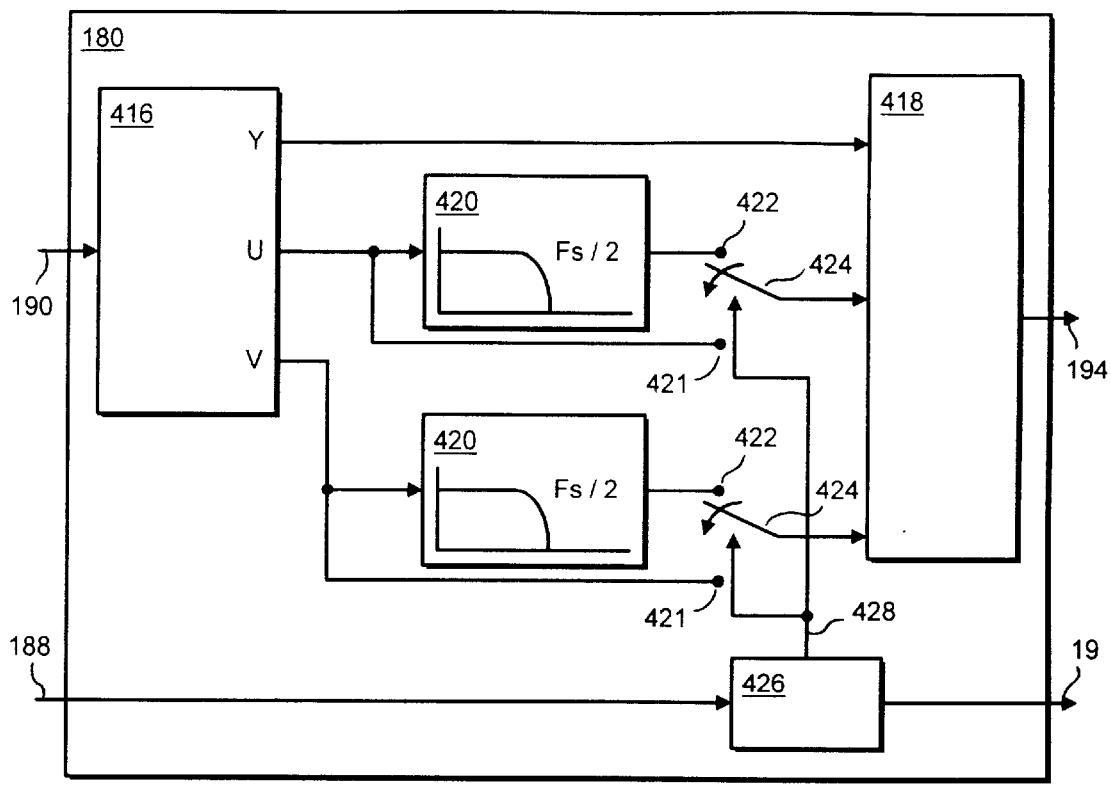
FIG. 25 is a schematic block diagram of a colour anti-aliasing processor which appears in FIG. 11.

The colour anti-aliasing processor 180 is shown in more detail in FIG. 25 where parts also appearing in FIG. 11 bear the same numerical designations. As shown in FIG. 25, the colour anti-aliasing processor 180 the legalised colour signal samples in rate 4:4:4 are fed to an input of a de-multiplexer 416. The de-multiplexer 416 operates to separate the signal samples associated with each of the three YUV colour difference signal components. The luminance component Y is fed to an output multiplexer 418, whereas the red and blue colour difference signal samples are fed respectively to an input of one of two corresponding anti-aliasing filters 420. Each of the anti-aliasing filters receives one of the two chrominance. U,V components of the legalised colour signal samples at an input, and in parallel the signal samples are fed to a first output terminal 421 of a switch 424. The anti-aliasing filters 420 operate to filter the signal samples in accordance with a low pass filter characteristic having a cut-off frequency approximately at half the value of the sampling frequency of the chrominance signals in 4:2:2 rate in order to substantially reduce aliasing errors in the chrominance signal samples in preparation for decimation from four samples (4:4:4) to two samples (4:2:2). The filtered signal samples remain however in over sampled form (4:4:4) having four samples per pixel and are fed to a second terminal 412 of the switch 424. The switch 424 is controlled by a control processor 426 from a control bus 428. The control processor 426 receives via the channel 188 the data which is representative of the modified flags which were generated in the colour legaliser 162 and fed via the decimating processor 178 to the colour anti aliasing filter. In a similar operation to that performed within the decimating processor 178, the control processor 426 operates to examine the modified flags within a window corresponding to the constraint length of the anti-aliasing filter 420, to determine whether the legalised signal samples have been changed by the colour legaliser 162 with respect to the corresponding input signal samples. If any of the legalised signal samples within the window have been changes with respect to the input signal samples, as indicated by one of the modified flags being set 'FALSE', then the switch 426 is set to the second of the input terminals 422 of the switch 424, and the filtered chrominance signal samples are fed from the output of the anti-aliasing filter 420 to the output multiplexer 418. If however none of the modified flags within the window corresponding to the constraint length of the anti-aliasing filter are 'FALSE' indicating that none of the legalised colour signal samples have been changed with reference to the input signal samples then the control processor 426 operates to feed appropriate control signals via a control bus 428 to set the switch 424 to the first terminal 421 so that the signal sample present at the second input terminal 422 is fed to the output multiplexer 418.

As already explained, the colour anti-aliasing filter 180, operates to filter the chrominance signal samples before the chrominance signal samples are decimated from four samples to two samples to form the 4:2:2 format. To this end, the control processor 426 operates to select either the unfiltered chrominance signal sample or the filtered chrominance signal sample, in dependence upon whether any of the corresponding input signal samples within the window corresponding to the constraint length of the filter has been changed in the legalised version of the signal sample, as indicated by the modified flags. This has a particular advantage because it has been found that one effect of filtering the legalised version of the signal samples can be to once again re-illegalise the colour pixel represented by the signal samples or to make an originally legal colour pixel illegal. By generating the modified flags which are received at the control processor 426 which indicate whether the legalised signal samples within the window have changed or not, an efficient process for bypassing the anti-aliasing filter is provided if the legalised signal samples have not changed with respect to input signal samples. After passing through or bypassing the anti-aliasing signal samples the YUV colour difference signal samples are re-multiplexed by the output multiplexer 418 operates to re-multiplex the signal samples from each of the signal components to form the YUV colour difference signals in 4:4:4 form. These legalised colour signal samples are then fed to the second adjustment factor generator 196 via the channel 194.

The second adjustment factor generator 196, the second colour legaliser 204 and the second adjustment factor softener 200 operate in combination to provide a second colour legalising process to the colour signal samples received from the decimating processor 180. Although the colour signal samples may be legal after the colour legaliser 162 has processed the input signal samples, it has been observed that the operations of the anti-aliasing filter, the second colour reference converter 182, the decimating processor 180 subsequently applied to the colour signal samples produced at the output of the first colour legaliser 162 can have an effect of altering some of these signal samples. As a result, the corresponding pixels in the RGB colour reference space produced from these components can be once again illegal colours because they correspond to points outside the RGB colour reference space. To remedy this problem and to provide a further improvement to the image processing apparatus shown in FIG. 11, a second stage of colour legalisation is applied to the signal samples received from the decimating processor 180 and this is afforded by the second adjustment factor generator 196 in combination with the second colour legaliser 204 in accordance with one of the methods of legalising the colour image described above. Once again however, the adjustment factors provided by the second adjustment factor generator 196 via the connecting channel 198 are softened by the second adjustment factor softener 200 which receives the adjustment factors at an input from the connecting channel 198. The second softener is implemented in substantially the same form as the softening filter 156 but will have a smaller window length. The colour signal samples are fed directly to the second colour legaliser 204 via the second connecting channel 202. The second colour legaliser operates to filter the adjustment factors using the same legalising method applied by the first colour legaliser 162. The softened adjustment factors are then fed to a second input of the second colour legaliser 204 via the channel 206. The second colour legaliser 204 then combines the softened adjustment factors with the colour signal samples and provides at an output of the second colour legaliser 204 final legalised colour signal samples. These are fed to the input of the colour difference conversion processor 208 via the channel 210. If the legalising method is applied in the RGB-signal format, then the second colour reference converter 182, would not convert the signal samples to YUV form, but the legalised colour signal samples would remain in RGB form, and would be converted to YUV form by the second colour conversion processor 208. This final colour conversion processor 208 converts the colour difference signal samples in YUV format to YCrCb format in accordance with equations (2) and (3). The colour conversion processor 208 also operates to decimate the red and blue chrominance signal samples to the effect of halving the sampling rate of these two chrominance signal samples so that at the output of the processor channel 211, the legalised colour signal samples are once again in the CCIR-601 4:2:2 format. Finally the legalised colour signal samples are duplicated by the duplicator 215 which operates to feed copies of the legalised colour signal samples in the 4:2:2 format to each of the two outputs 12 and 14.

A further output channel 19 from the image processing apparatus 1 shown in FIG. 11 is provided from a second output from the decimating processor 180 provides a copy of the data representative of the modified flags. These modified flags are fed to the host control processor 16 which is shown in FIG. 3 and which operates to display on the visual display unit 20 a representation of the corresponding location and value of those pixels of the colour image which were illegal.

As will be appreciated by those skilled in the art, various modifications may be made to the example embodiments without departing from the scope of the present invention. In particular whilst the preferred embodiments have been described with reference to signal samples in the form of colour difference signal samples having colour difference components, it will be appreciated that the image processing apparatus can operate with colour signal samples representative of a colour video image in any format. Furthermore it will be understood that whilst the embodiments of the invention have been described in a form in which an image processing apparatus operates to perform certain functions, it will be understood that the embodiments of the invention could be implemented in the form of dedicated hardware or alternatively could be implemented as a data processor or a set of data processors operating to fulfil the function of the features of the embodiments by executing appropriate software. It will therefore be appreciated that a computer programme providing the function of these features when executed on a data processor or a set of data processors and a storage medium on which such a computer programme may be stored are envisaged as aspects of the present invention.

We claim:

1. A method of processing input signal samples representative of at least part of a colour video image to produce legalised signal samples representative of a legal colour version of said image, said method comprising the steps of:

generating an over sampled version of the input signal samples by generating at least one extra signal sample for each base input signal sample;

generating adjustment factors from said input signal samples, which when combined with said input signal samples have an effect of converting illegal colour pixels of said colour video image into legal colour pixels;

combining said adjustment factors with said input signal samples to produce an over sampled version of said legalised colour signal samples; and decimating said over sampled legalised colour signal samples to produce decimated legalised signal samples having a sampling rate corresponding to that of the base input signal samples, by selecting signal samples from the over sampled version of the legalised colour signal samples which have not changed with respect to the corresponding input signal samples, and if the signal samples have changed, combining a plurality of said over sampled legalised colour signal samples to produce said decimated legalised signal samples.

2. A method as claimed in claim 1, wherein said over sampled version of said legalised colour signal samples has base signal samples corresponding to the sampling points of said base input signal samples and extra signal samples corresponding to samples produced by over sampling, and the step of decimating said legalised colour signal samples comprises the steps of determining whether each of said base legalised colour signal samples and said extra legalised colour signal samples associated with said base legalised colour signal samples were changed with respect to the corresponding input signal samples when combined with said adjustment factors, and for each base legalised colour signal sample, if at least one of said each base and at least one associated extra input signal sample has changed with respect to said legalised colour signal samples;

combining said base and said associated extra legalised colour signal samples to form a corresponding decimated legalised signal sample; or if none of said each base and said associated extra legalised colour signal samples have changed;

discarding said associated extra legalised colour signal samples, and forming said decimated signal sample from said each legalised colour signal sample.

3. A method as claimed in claim 2, wherein the step of combining said base and said associated extra legalised colour signal samples which have changed, comprises the step of filtering said legalised colour signal samples with an anti aliasing filter, having a band width substantially equal to half the sampling frequency used to represent the over sampled version of the legalised colour signal samples.

4. A method as claimed in claim 1, wherein said input signal samples are colour difference signal samples having a luminance and two colour difference components, said method comprising the steps of converting the input colour difference signal samples into a colour reference signal sample having components representative of three orthogonal colour reference axes of red, green and blue;

combining said colour reference signal samples with said adjustment factors; and converting said combined colour reference signal samples into colour difference signal samples.

5. A method as claimed in claim 1, wherein said adjustment factors are scaling factors, and the step of combining said adjustment factors with said input signal samples comprises multiplying said adjustment factors with said colour difference signal sample.

6. An image processing apparatus which operates to process signal samples representative of at least part of a colour video image to produce legal colour signal samples representative of a legal colour version of said image, said apparatus comprising an over sampling processor which operates to generate an over sampled version of the input signal samples by generating at least one extra signal sample for each base input signal sample;

an adjustment factor generator, which operates to generate a plurality of adjustment factors which when combined with said input signal samples have an effect of converting illegal colour pixels of said colour image into legal colour pixels;

a colour legaliser coupled to said adjustment factor generator, which operates to combine said adjustment factors with said input signal samples to produce the legalised colour signal samples; and a decimating processor coupled to the colour legaliser which operates to decimate said over sampled legalised colour signal samples to produce decimated legalised signal samples having a sampling rate corresponding to that of the base input signal samples, by selecting signal samples from the over sampled version of the legalised colour signal samples which have not changed with respect to the corresponding input signal samples, and if the signal samples have changed combining a plurality of said over sampled legalised colour signal samples to produce said decimated legalised signal samples.

7. An image processing apparatus as claimed in claim 6, wherein said decimating processor operates to determine whether each of said base legalised colour signal samples and said extra legalised colour signal samples associated with said base legalised colour signal samples were changed with respect to the corresponding input signal samples when combined with said adjustment factors, and for each base legalised colour signal sample, if at least one of said each base and at least one extra input signal sample associated with said each base signal sample has changed with respect to said legalised colour signal samples;

to combine said base and said associated extra legalised colour signal samples to form a corresponding decimated legalised signal sample; or if neither of said each base and said associated extra legalised colour signal samples have changed;

to discard said associated extra legalised colour signal samples, and forming said decimated signal sample from said base legalised colour signal sample.

8. An image processing apparatus as claimed in claim 7, wherein said decimating processor has an anti-aliasing filter having a bandwidth substantially equal to half the sampling frequency used to represent the over sampled version of the legalised colour signal samples, and said decimating processor operates to combine said base and said associated extra legalised colour signal samples which have changed by filtering said base and said associated extra legalised colour signal samples with said anti-aliasing filter.

9. An image processing apparatus as claimed claim 6, wherein said input signal samples are colour difference signals having a luminance and two colour difference components, said apparatus comprising a colour conversion processor coupled in operative association with said adjustment factor generator, which operates to generate a version of said input signal samples in the form of colour reference signal samples having components in corresponding to red, green and blue light by converting said input signal samples in the form of colour difference signal samples, said version of said input signal samples in colour reference form and the version in the colour difference form being feed in parallel to said adjustment factor generator.

10. An image processing apparatus as claimed in claim 6, wherein said adjustment factors are scaling factors between zero and one, said colour legaliser operating to multiply said scaling factors with said input signal samples.

11. A computer program having a plurality of instructions substantially corresponding to the method of processing input signal samples according to claim 1.

12. A computer program product comprising a computer readable carrier having stored thereon a computer program, which when loaded on to a computer performs the steps of the method according to claim 1.

13. A computer programmed with a computer program according to claim 12.

14. A video signal processing system comprising a video reproducing apparatus operable to reproduce video signal samples representative of at least part of a colour video image, an image processing apparatus which operates to process said video signal samples to produce legal colour signal samples representative of a legal colour version, of said image, said image processing apparatus comprising an over sampling processor which operates to generate an over sampled version of the input signal samples by generating at least one extra signal sample for each base input signal sample;

an adjustment factor generator, which operates to generate a plurality of adjustment factors which when combined with said input signal samples have an effect of converting illegal colour pixels of said colour image into legal colour pixels;

a colour legaliser coupled to said adjustment factor generator, which operates to combine said adjustment factors with said input signal samples to produce the legalised colour signal samples; and a decimating processor coupled to the colour legaliser which operates to decimate said over sampled legalised colour signal samples to produce decimated legalised signal samples having a sampling rate corresponding to that of the base input signal samples, by selecting signal samples from the over sampled version of the legalised colour signal samples which have not changed with respect to the corresponding input signal samples, and if the signal samples have changed combining a plurality of said over sampled legalised colour signal samples to produce said decimated legalised signal samples.

15. A video signal processing system as claimed in claim 14, comprising a display means which is arranged in operation to display said legalised colour signal samples.

16. A video signal processing system as claimed in claim 14, wherein said reproducing apparatus is also a recording apparatus and said legalised colour signal samples are recorded onto a readable medium by said recording/reproducing apparatus.

17. A video signal processing system as claimed in claim 16, comprising a recording apparatus, wherein said legalised colour signal samples are recorded onto a recordable medium by said recording apparatus.

\* \* \* \* \*